(12) United States Patent
Bursell et al.

(10) Patent No.: US 11,741,221 B2
(45) Date of Patent: Aug. 29, 2023

(54) USING A TRUSTED EXECUTION ENVIRONMENT TO ENABLE NETWORK BOOTING

(71) Applicant: Red Hat, Inc., Raleigh, NC (US)

(72) Inventors: Michael Hingston McLaughlin Bursell, Farnborough (GB); Dmitri Pal, Chelmsford, MA (US)

(73) Assignee: Red Hat, Inc., Raleigh, NC (US)

( * ) Notice: Subject to any disclaimer, the term of this patent is extended or adjusted under 35 U.S.C. 154(b) by 332 days.

(21) Appl. No.: 16/942,471

(22) Filed: Jul. 29, 2020

(65) Prior Publication Data
US 2022/0035904 A1  Feb. 3, 2022

(51) Int. Cl.
| G06F 21/53 | (2013.01) |
|---|---|
| G06F 9/4401 | (2018.01) |
| G06F 9/445 | (2018.01) |
| G06F 8/61 | (2018.01) |
| H04L 67/06 | (2022.01) |
| G06F 9/455 | (2018.01) |
| G06F 21/62 | (2013.01) |
| G06F 21/60 | (2013.01) |

(52) U.S. Cl.
CPC ............ *G06F 21/53* (2013.01); *G06F 8/63* (2013.01); *G06F 9/4416* (2013.01); *G06F 9/44505* (2013.01); *G06F 9/45558* (2013.01); *G06F 21/602* (2013.01); *G06F 21/62* (2013.01); *H04L 67/06* (2013.01); *G06F 2009/45562* (2013.01); *G06F 2009/45587* (2013.01); *G06F 2221/2149* (2013.01)

(58) Field of Classification Search
None
See application file for complete search history.

(56) References Cited

U.S. PATENT DOCUMENTS

| 7,941,509 B2 | 5/2011 | Sharma et al. |
| 8,335,915 B2 | 12/2012 | Plotkin et al. |
| 8,572,370 B1 | 10/2013 | Tormasov |
| 8,843,650 B2 | 9/2014 | Song et al. |

(Continued)

OTHER PUBLICATIONS

Reyk Floeter, VXLAN and Cloud-based Networking with OpenBSD, https://2017.asiabsdcon.org/papers/abc2014-proc-all.pdf#page=91, Mar. 2014, 202 pages.

(Continued)

*Primary Examiner* — William J. Goodchild
(74) *Attorney, Agent, or Firm* — Lowenstein Sandler LLP

(57) ABSTRACT

The technology disclosed herein enables a computing device to use a trusted execution environment in an untrusted device to distribute executable image data (e.g., network bootable image) to a set of one or more computing devices. An example method may include: establishing, by a processor, the trusted execution environment in a first computing device, wherein the trusted execution environment comprises an encrypted memory area; loading executable code into the trusted execution environment, wherein the executable code controls access to protected content and wherein the protected content comprises executable image data; and causing the executable code to execute in the trusted execution environment to analyze data of a second computing device and to provide the second computing device access to the protected content.

20 Claims, 9 Drawing Sheets

(56) References Cited

U.S. PATENT DOCUMENTS

| | | | |
|---|---|---|---|
| 9,047,468 | B2 | 6/2015 | Sakthikumar et al. |
| 9,425,965 | B2 | 8/2016 | Baumann et al. |
| 9,674,182 | B2 | 6/2017 | Smith |
| 9,697,371 | B1 | 7/2017 | Willden et al. |
| 9,722,775 | B2 | 8/2017 | Hjelm et al. |
| 9,985,782 | B2 | 5/2018 | McCallum |
| 10,180,845 | B1 | 1/2019 | Nunes |
| 10,506,012 | B2 | 12/2019 | Lee |
| 2014/0040890 | A1* | 2/2014 | Novak ............ G06F 21/53 718/1 |
| 2014/0052989 | A1 | 2/2014 | Jones et al. |
| 2015/0058629 | A1* | 2/2015 | Yarvis ............ H04L 63/061 713/171 |
| 2016/0087792 | A1 | 3/2016 | Smith et al. |
| 2016/0350534 | A1 | 12/2016 | Poornachandran et al. |
| 2018/0089438 | A1* | 3/2018 | Oh ................ G06F 21/577 |
| 2019/0155728 | A1 | 5/2019 | Ferguson et al. |
| 2019/0238323 | A1 | 8/2019 | Bunch et al. |
| 2019/0339986 | A1 | 11/2019 | Khatri et al. |
| 2020/0242267 | A1* | 7/2020 | Weiss ............ H04L 63/0428 |
| 2020/0374112 | A1 | 11/2020 | Sovio et al. |
| 2021/0150065 | A1 | 5/2021 | Qiu |
| 2021/0218560 | A1 | 7/2021 | Nix |
| 2021/0234684 | A1 | 7/2021 | Maruyama et al. |

OTHER PUBLICATIONS

"Trust No One, Run Everywhere—Introducing Enarx", 2019, Red Hat, Inc., 8 pages.

"Using Network-Bound Disk Encryption", 2020, Red Hat, Inc., https://access.redhat.com/documentation/en-US/Red_Hat_Enterprise_Linux/7/html/Security_Guide/sec-Using_Network-Bound_Disk_Encryption.html, 12 pages.

Sarhan, A. Y,. et al, "An Approach to Identity Management in Clouds without Trusted Third Parties", Nov. 7, 2014, Western Michigan University, https://arxiv.org/ftp/arxiv/papers/1904/1904.00880.pdf, 11 pages.

Clevis and Tang, "Securing your Secrets at Rest", Jan. 15, 2020, Red Hat, Inc., https://speakerdeck.com/frasertweedale/clevis-and-tang-securing-your-secrets-at-rest, 1 page.

"Configuring Automated Unlocking of Encrypted Volumes using Policy-based Decryption", Red Hat, Inc., downloaded Feb. 28, 2020, 12 pages.

Sen, J., "Security and Privacy Issues in Cloud Computing", Innovation Labs, Tata Consultancy Services Ltd., https://arxiv.org/ftp/arxiv/papers/1303/1303.4814.pdf, downloaded Jan. 15, 2021, 42 pages.

* cited by examiner

USING A TRUSTED EXECUTION ENVIRONMENT TO ENABLE NETWORK BOOTING

TECHNICAL FIELD

The present disclosure generally relates to provisioning computing devices over a computer network, and more specifically relates to enabling a computing device to access executable data over an untrusted network in a security enhanced manner.

BACKGROUND

Modern computing environments may include infrastructure that automatically updates and configures computers within a computing environment. The computers may be machines that are being added to the computing environment and may be absent an operating system, application, or other computer program. Adding a computer that is absent an operating system may be referred to as adding a bare machine (e.g., bare metal machine). The bare machine may include a built in module that enables it to communicate with the computer network and the computer network may provide confidential or proprietary computer programs (e.g., applications and operating systems) and configuration information to the bare machine. This may enable the bare metal machine to install a computer program and perform computing tasks.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
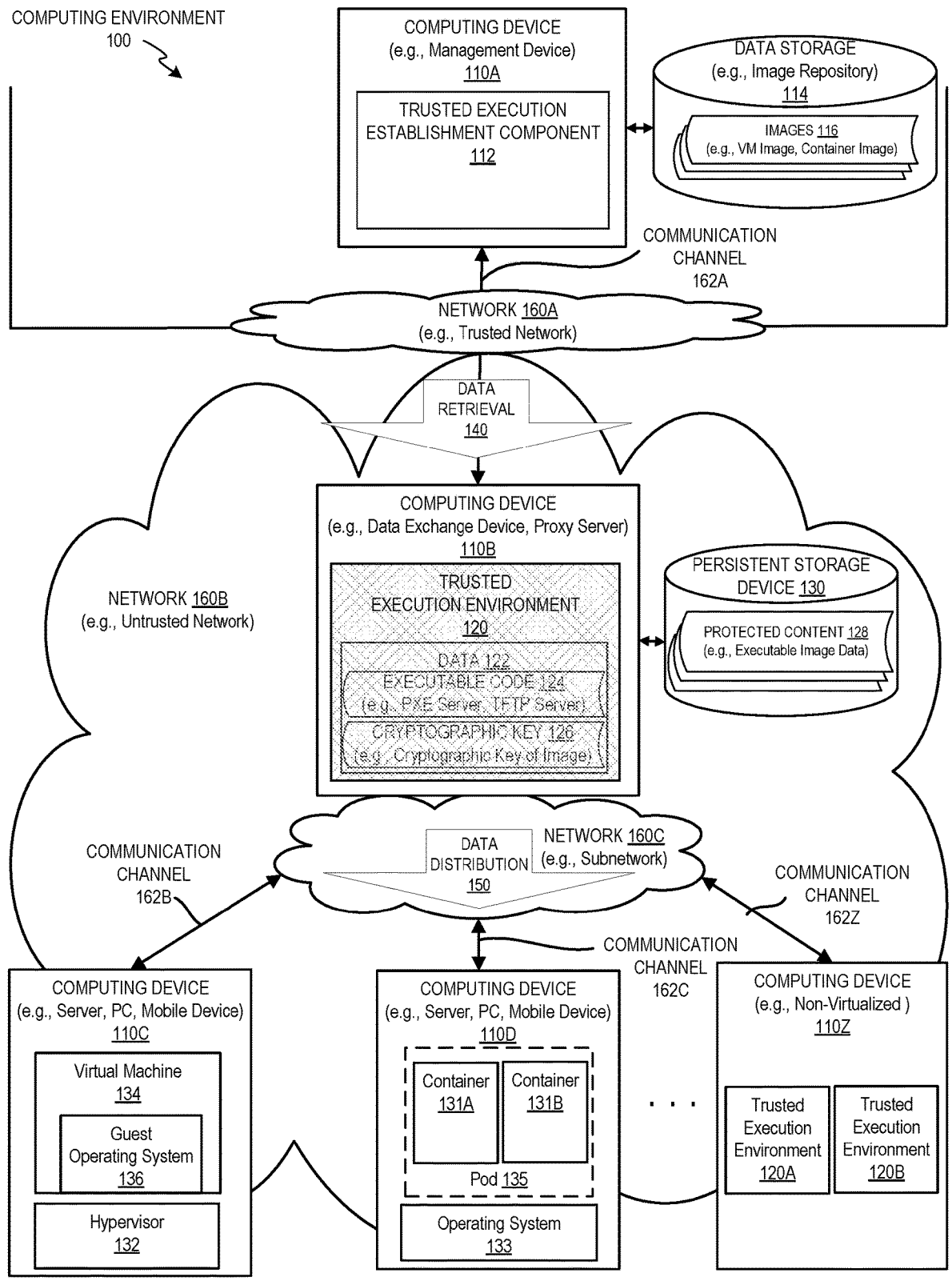
FIG. 1 depicts a high-level block diagram of an example computing environment that uses a trusted execution environment in a computing device to transfer protected content between other computing devices, in accordance with one or more aspects of the present disclosure.

Modern computing environments enable a state of a computing system to be stored as an image. The image may include confidential or proprietary executables and configuration information that may be loaded onto a device and executed by the device to provide a computing service. Due to the confidential nature of the images, access to the images may be restricted to devices within a trusted network to enhance security. The computing environments often have a need to update devices that are external to the trusted network (e.g., edge devices). Access to one or more of the devices may be constrained because the untrusted network may have intermittent connectivity, high error rate, low bandwidth, or may be absent a direct connection to one or more devices that should be updated. The constrained access may make it challenging or impossible to directly update computing devices that are external to the trusted network.

Aspects of the present disclosure address the above and other deficiencies by providing technology that enables the computing environment to use one of the computing devices external to the trusted network as a data exchange device (e.g., proxy server) to store protected content and distribute the protected content to the other computing devices. The protected content may include executable image data (e.g., VM images, container images) that is provided to and executed by the computing devices. In one example, a management device of the computing environment (e.g., provisioning server) may select one of the computing devices external to the trusted network to function as the data exchange device. The selection may be based on one or more attributes of the computing devices (e.g., storage resources, network connection, geographic location, processing power, power source, etc.). The selected data exchange device may function as an intermediate device that can be communicatively coupled to the management device and communicatively coupled to each of the computing devices that will be updated. The data exchange device may initially be untrusted by the management device and may be vulnerable to being maliciously compromised before, during, or after storing the protected content. The technology disclosed herein mitigates vulnerabilities of the data exchange device by establishing a trusted execution environment in the data exchange device.

The trusted execution environment (TEE) may execute one or more processes and use hardware based encryption to isolate the data of the processes from other processes running on the data exchange device. In one example, the data of a process executing in the trusted execution environment may be encrypted using cryptographic keys that are accessible to a hardware processor of the data exchange device but are inaccessible to all the processes running on the data exchange device (e.g., hardware level encryption). The hardware processor may encrypt or decrypt the data of the process executing in the trusted execution environment when the process stores or accesses the data. This enables the trusted execution environment to isolate data of a lower privileged process (e.g., application process or virtual machine process) executing within the trusted execution environment from being accessed by a higher privileged processes (e.g., kernel or hypervisor) even though the higher privileged processes may be responsible for managing the lower privileged process.

The data exchange device may use the trusted execution environment to store the protected content and to execute executable code that controls access to the protected content. The executable code may enable the data exchange device to provide data retrieval services, data distribution services, or a combination thereof. The data retrieval services may involve the trusted execution environment executing code to interact with a management device and obtain the protected content. The data distribution services may involve the trusted execution environment executing code that provides a portion of the protected content to one or more recipient devices. The protected content may be the same data that was received by the data exchange device or may be different data that was derived from data of the management device or from another computing device. In one example, the trusted execution environment of the data exchange device may be used to establish a Preboot Execution Environment (PXE) and enable one or more untrusted computing devices to access and load network bootable images using a Trivial File Transfer Protocol (TFTP), as discussed in more detail below.

Systems and methods described herein include technology that enables a computing device to use a trusted execution environment to transfer data between computing devices. In particular, aspects of the disclosed technology may enable computing devices to transfer protected content in the absence of a direct communication by loading the protected content and executable code that controls access to the protected content into a trusted execution environment of an intermediate device (e.g., data exchange device). The executable code may be used to authenticate and provide access to the protected content without requiring a mutually trusted third party (e.g., certificate authority) or back-and-forth communication between the originating device and recipient devices (e.g., management device and device being updated).

In other aspects, the disclosed technology may enable the data exchange device to securely transfer the protected content without exposing the protected content to an operating system of the data exchange device, which may or may not have been subverted (e.g., maliciously compromised). The trusted execution environment may be implemented and enforced by a hardware processor and may isolate the protected content and executable code from being accessed by any and all processes executed outside the trusted execution environment. Therefore, if the operating system, driver, or application of the data exchange device was maliciously compromised it would not have access to data of a process executing in the trusted execution environment of the data exchange device.

Various aspects of the above referenced methods and systems are described in details herein below by way of examples, rather than by way of limitation. The examples provided below discuss a computing device that is used as a data exchange device to perform data retrieval from a device in a trusted network and data distribution to one or more devices in an untrusted network. In other examples, the data exchange device may perform data retrieval or data distribution in the same network (e.g., trusted or untrusted) or in the absence of a network using direct communication channels (e.g., USB™, Bluetooth™, Wifi Direct™, etc.).

FIG. 1 depicts an illustrative architecture of elements of a computing environment 100, in accordance with an example of the present disclosure. It should be noted that other architectures for computing environment 100 are possible, and that the implementation of a computing environment utilizing embodiments of the disclosure are not necessarily limited to the specific architecture depicted. In the example shown in FIG. 1, computing environment 100 may include computing devices 110A-Z and one or more of computing devices 110A-Z may include a trusted execution environment 120 that can be used to enable security enhanced data retrieval 140, data distribution 150, or a combination thereof.

Computing devices 110A-Z may include any computing devices that are capable of storing or accessing data and may include one or more servers, workstations, desktop computers, laptop computers, tablet computers, mobile phones, palm-sized computing devices, personal digital assistants (PDAs), smart watches, robotic devices (e.g., drones, autonomous vehicles), data storage device (e.g., USB drive), other device, or a combination thereof. Computing devices 110A-Z may include one or more hardware processors based on x86, PowerPC®, SPARC®, ARM®, other hardware, or a combination thereof.

Computing device 110A may manage one or more of the other computing devices and may be referred to as a management device. The management device may be an orchestration server, a provisioning server, other server, or a combination thereof. Managing other devices may involve computing device 110A executing one or more operations to install, configure, instantiate, run, or execute one or more programs on one or more other computing devices. Computing device 110A may be communicative coupled with data storage 114.

Data storage 114 may function as an image repository that stores one or more images 116 for computing devices 110C-Z. Data storage 114 may include one or more data storage device that include block-based storage devices, file-based storage devices, or a combination thereof. Block-based storage devices may include one or more data storage devices (e.g., Storage Area Network (SAN) devices) and may provide access to consolidated block-based (e.g., block-level) data storage. Block-based storage devices may be accessible over a network and may appear to an operating system of a computing device as locally attached storage. File-based storage devices may include one or more data storage devices (e.g., Network Attached Storage (NAS) devices) and provide access to consolidated file-based (e.g., file-level) data storage that may be accessible over a network.

Images 116 may be any data structure for storing and organizing information that may be used by a computing device to provide a computing service. Images 116 may the same or similar to an executable image, a machine image, an operating system image, application image, a program image, device image, other term, or a combination thereof. The information within images 116 may indicate the state of the image and may include executable data (e.g., executable instructions, commands, machine code), configuration information (e.g., settings), or content information (e.g., file data, record data). Each of the images 116 may be capable of being loaded onto a computing device and may be executed to perform one or more computing tasks.

Images 116 may be virtual machine images, container images, disk images, other images, or a combination thereof. A virtual machine image may include both an operating system and one or more user space programs. The virtual machine image may be loaded onto a computing device (e.g., 110C) and may be managed by a hypervisor. A container image may include a user space program (e.g., application) along with a file system that contains the executable code, runtime, system tools, system libraries, and other programs to support the execution of the user space program. The container image may be absent (e.g., without, missing, free of) an operating system but may be run by an operating system virtualizer that is part of an existing operating system of a computing device (e.g., 110D). A disk image may be the same or similar to a virtual machine image (e.g., virtual disk image) but may be loaded onto a computing device (e.g., 110Z) and run without using a hypervisor or other form of virtualization technology. In one example, an image may be generated by creating a sector-by-sector copy of a source medium (e.g., hard drive of example machine). In another example, a disk image may be generated based on an existing image and may be manipulated before, during, or after being loaded and executed. The format of images 116 may be based on any proprietary format or any open standard, such as the ISO image format for optical disc images.

Computing device 110A may include a trusted execution establishment component 112 that enables computing device 110A to establish one or more trusted execution environments 120 on computing device 110B. In one example, a single trusted execution environment 120 may be established to retrieve and distribute data stored in data storage 114 to the multiple computing devices 110C-Z. In another example, multiple trusted execution environments 120 may be established and the different trusted execution environments may be used to retrieve and distribute different protected content items (e.g., TEE per image, TEE per set of images), protected content from different sources (e.g., TEE per Management Device, TEE per Image Repository), or a combination thereof. In either example, the data that is being retrieved and distributed by computing device 110B may be stored in a persistent storage device 130 as protected content 128.

Protected content 128 may be any data that is protected while stored by computing device 110B and can be shared between computing devices. Protected content 128 may be the same or similar to sensitive data, confidential data, secret data, classified data, or other data and may be protected using any technique that enhances data confidentiality, data integrity, data availability, or a combination thereof. Protected content 128 may include or be based on images 116 and may be referred to as executable image data. The executable image data may include one or more images and may be in the same format as images 116 (e.g., image data structure) or may be in a different format as images 116. The executable image data may include executable data (e.g., executables, libraries), non-executable data (e.g., informational data), document data (e.g., documents, spread sheets, slides), other data, or a combination thereof.

Computing device 110B may function as a data exchange device and may be updated to include a trusted execution environment 120 that can be loaded with executable code that controls access to protected content 128. Computing device 110B may use the trusted execution environment 120 to perform data retrieval 140, data distribution 150, or a combination thereof. Protected content 128 may originate from computing device 110A and may be transferred from computing device 110A to computing device 110B and loaded into trusted execution environment 120.

Trusted execution environment 120 (TEE) may be the same or similar to trusted execution environments 120A-B of computing device 110Z and each may use hardware based encryption to isolate the data of a process (e.g., user space process, VM, container) from other processes running on the same computing device. In one example, the data of a process executing in the trusted execution environment may be encrypted using cryptographic keys that are accessible to a hardware processor of the computing device but are inaccessible to all the processes running on the computing device (e.g., hardware level encryption). The hardware processor may encrypt or decrypt the data of the process executing in the trusted execution environment when the process stores or accesses the data. This enables the trusted execution environment to isolate data of a lower privileged process (e.g., application process or virtual machine process) executing within the trusted execution environment from being accessed by a higher privileged processes (e.g., kernel or hypervisor) even though the higher privileged processes may be responsible for managing the lower privileged process. Trusted execution environment may provide code execution, storage confidentiality, and integrity protection, and may store, execute, and isolate protected content 128 from other processes executing on the same computing device, as discussed in more detail in regards to FIGS. 2-3.

Trusted execution environment 120 may be an ephemeral execution environment that comprises non-persistent storage of computing device 110B and may or may not persistently store data on persistent storage device 130. The non-persistent storage may include data storage devices that lose data in response to an interruption and may include volatile memory (e.g., main memory), processor registers (e.g., CPU or GPU registers), other non-persistent cache, or a combination thereof. Persistent storage device 130 may be internal to computing device 110B and accessible over a device bus or may be external to computing device 110B and accessible over a network connection (e.g., communication channel). In one example, persistent storage device 130 may include data storage that does not lose data in response to an interruption and may include one or more hard disk devices, solid-state storage devices, tape drive devices, network storage devices, other persistent data storage medium, or a combination thereof. The interruptions may be any event that affects the ephemeral execution environment or the ability of the computing device to process or store data of the ephemeral execution environment. The interruption may be the result of an intentional act (e.g., IT administrator command) or unintentional act (e.g., defect) and may be caused by a restart (e.g., process restart or device restart), a failure (e.g., power failure, hardware failure, program failure), other event, or combination thereof. In one example, persistent storage device 130 may be the same or similar to data storage 114 but may be external to network 160A (e.g., external to the trusted network).

Executable code 124 may be loaded into trusted execution environment 120 and may control how computing device 110B interacts with protected content 128. In one example, executable code 124 and protected content 128 may be received from the same computing device (e.g., 110A) and loaded into the trusted execution environment 120 together. In another example, executable code 124 and protected content 128 may be received from different computing devices and loaded separately into trusted execution environment 120. For example, the protected content 128 may be received from or generated by a first computing device (e.g., 110A) and portions of protected content 128 may be received from one or more other computing devices. In either example, executable code 124 may include executable data, configuration data, other data, or a combination thereof and may be stored and executed in the trusted execution environment 120. Executable code 124 may be stored in any format and may include one or more file system objects (e.g., files, directories, links), database objects (e.g., records, tables, field value pairs, tuples), other storage objects, or a combination thereof. Executable code 124 may implement logic for controlling the distribution, retrieval, or use of protected content 128 and logic that is implemented may depend on whether the use of the data exchange device is for data retrieval 140, data distribution 150, or a combination thereof.

Data retrieval 140 may involve configuring computing device 110B to retrieve protected content 128 from another device (e.g., management device or data storage in a trusted network). When performing data retrieval 140, computing device 110B may be referred to as an intermediate device, proxy device, caching device, a provisioning device, image retrieval device, other device, or a combination thereof. As discussed above, computing device 110B may be associated with an untrusted network and may not be trusted by computing device 110A or computing devices 110C-Z but may be configured with a trusted execution environment 120 and remote attestation operations to establish trust with the other computing devices. The remote attestation operations are discussed in more detail in regards to FIG. 3 and may enable the data exchange device to verify to each of the other computing devices the integrity and confidentiality of trusted execution environment 120. Configuring computing device 110A to perform data retrieval 140 is discussed in more detail in regards to FIG. 4.

Data distribution 150 may involve configuring computing device 110B to share protected content 128 with one or more of computing devices 110C-Z. As discussed above, the management device (e.g., computing device 110A) may be absent a reliable communication channel with computing devices 110C-Z and may use computing device 110B as a data storage device, a proxy device, a caching device, a courier device, a data transfer device, gateway device, edge device, or other device. The management device may enable or instruct computing device 110B to provide protected content 128 to the other computing devices. Protected content 128 may include executable image data and access to protected content may be controlled by executable code 124. Configuring computing device 110B to perform data distribution 150 is discussed in more detail in regards to FIG. 5 and may include logic for controlling the authentication, authorization, and access of computing devices 110C-Z to protected content 128.

Executable code 124 may enable computing device 110 to provide a network installation environment for computing devices 110C-Z. The network installation environment may enable computing devices 110C-Z to access executable image data and to install the executable image data over a network. The network installation environment may provide the executable image data to one of the computing devices 110C-Z before it boots, during its boot, after it boots, or a combination thereof. Booting may be the process of starting the computing device and may be initiated by a hardware device (e.g., button press), a program (e.g., start command), a signal (e.g., a digital signal or analog signal), or a combination thereof. When the booting is initiated, the main memory and central processing unit (CPU) may be absent executable data and the executable data (e.g., executable image data) may be loaded over the network into main memory so it can be executed. The loading may be done by hardware or firmware in the CPU, network interface (e.g., network interface card (NIC)), other processor, or a combination thereof. The booting may be complete when an operative runtime system (e.g., operating system, embedded system, or application) is initialized. In one example, the network installation environment may enable network booting.

Network booting may enable a computing device to load executable image data over a computer network before or during a boot process (e.g., pre-boot loading). The executable image data may include an operating system and the executable data image may be transferred to the computing device over a network using a file transfer protocol (e.g., Trivial File Transfer Protocol (TFTP)). The executable data image may be loaded and executed by the computing device and the operating system may take control and complete the booting process. Network booting may rely on network access provided by a network interface's boot ROM, which may contain a preboot image. The Preboot image may be absent a kernel and device drivers and may enable the network interface to boot and receive the executable image data that includes the kernel and device drivers over one or more network communication channels (e.g., 162A-Z). In one example, the network booting may be a preboot execution environment that is the same or similar to Apple™ NetBoot™, Apple Boot Server Discovery Protocol (BSDP), Microsoft™ Remote Installation Services (RIS), Microsoft Windows Deployment Services (WDS), Deployment Toolkit (MDT), Microsoft System Center Configuration Manager (SCCM), Microsoft Boot Information Negotiation Layer (BINL), HP™ OpenVMS™, Syslinux PXELINUX, Preboot Execution Environment (PXE, gPXE, iPXE), other product or service, or a combination thereof.

The preboot execution environment may provide a standardized client-server environment that boots a network bootable image retrieved over a network. Computing device 110B may be configured with a server portion of PXE (e.g., PXE server) that provides the executable image data to the one or more computing devices 110C-Z, which are configured with the client portion of PXE (e.g., PXE clients). The preboot execution environment may support a secure boot that can secure the boot process and prevent the loading of executable image data that is not signed with an acceptable digital signature (e.g., unsigned OS or device driver). When secure boot is enabled, computing devices 110C-Z may begin in a "setup" mode that allows a public key known as the "platform key" (PK) to be written to the firmware. Once the key is written, secure boot enters "User" mode, where executable image data signed with the platform key can be loaded by the firmware and executable image data that is not signed with the platform key cannot be loaded by the firmware. Additional "key exchange keys" (KEK) can be added to the computing device. Secure boot can also be placed in "Custom" mode, where additional public keys can be added to the system that do not match the private key and can enable other executable image data to be accessed and loaded.

A computing device configured as a PXE client may include a network interface controller (NIC) that supports PXE and may use a set of network protocols to access the network bootable image. The set of protocols may be implemented in a client's NIC firmware, resulting in standardized small-footprint PXE ROMs. The set of protocols may include UDP/IP, TFTP, and Dynamic Host Configuration Protocol (DHCP). DHCP may be used to provide the appropriate client network parameters and specifically the location (IP address) of the TFTP server hosting, ready for download, the initial bootstrap program and complementary files. To initiate a PXE bootstrap session, the DHCP component of the client's PXE firmware may broadcast a discover request (e.g., DHCPDISCOVER packet) containing PXE-specific options to the DHCP server port (e.g., port 67/UDP). The discover request may request the network configuration and network booting parameters and the PXE-specific options may identify the initiated DHCP transaction as a PXE transaction. A standard DHCP server (e.g., non PXE enabled) may be able to answer with a regular DHCPOFFER carrying networking information (i.e. IP address) but may be absent the PXE specific parameters. A PXE client may be unable to boot if it receives an answer from a non PXE enabled DHCP server. After parsing a PXE enabled DHCP server DHCPOFFER, the client may be able to set its own network IP address, IP Mask, etc., and to point to the network located booting resources, based on the received TFTP Server IP address and the name of the Network Bootstrap Program (NBP). The client next transfers the NBP into its own random-access memory (RAM) using TFTP, possibly verifies it (e.g., Secure Boot), and finally boots from it. NBP may be an initial link in the boot chain process and may request via TFTP a small set of complementary files in order to run a minimalistic OS executive (i.e. WindowsPE, or a basic Linux kernel+initrd). The small OS executive may load its own network drivers and TCP/IP stack. At this point, the remaining instructions required to boot or install a full OS may be provided using a data transfer protocol (such as HTTP, CIFS, NFS, or TFTP).

Executable code 124 may use one or more cryptographic keys 126 to restrict access to protected content 128. Cryptographic key 126 may include cryptographic key data with one or more cryptographic bit sequences or other cryptographic keying material for storing, generating, or deriving a set of one or more cryptographic keys. Cryptographic key data may be represented in a human readable form (e.g., passcode, password), a non-human readable form (e.g., digital token, digital signature, or digital certificate), other form, or a combination thereof. Cryptographic key data may be input for a cryptographic function, output of a cryptographic function, or a combination thereof. Cryptographic key data may include one or more encryption keys, decryption keys, session keys, transport keys, migration keys, authentication keys, authorization keys, integrity keys, verification keys, digital tokens, license keys, certificates, signatures, hashes, other data or data structure, or a combination thereof. The cryptographic key data may include any number of cryptographic keys and may be used as part of a cryptographic system that provides privacy, integrity, authentication, authorization, non-repudiation, other features, or a combination thereof.

Cryptographic key 126 may be a set of cryptographic keys that includes one or more keys for each of computing devices 110C-Z. Each key in the set may be related or unrelated to some or all of the other keys in the set. In one example, a key may be related to another key in the set if they are both the output of a key splitting operation. The key splitting operation may split a cryptographic key into multiple keys (e.g., key AB split into key A and key B). In another example, a key may be related to another key in the set if they are mathematically related via a public/private key relationship or via key thresholding. As used throughout this application, the term "key" or "cryptographic key" may be a general term that corresponds to any portion of key material (e.g., bit sequence) that is used as input to a cryptographic function. The term key may correspond to an entire key, a fragment of a key (e.g., key fragment, key part, key portion, key piece, key element, key unit, key share, key shard, other term), a combined key (e.g., aggregate key, composite key, combination key, merged key), other bit sequence, or a combination thereof. Any use of the term key fragment or key share may be replaced with key without changing the concepts discussed. Two or more of the keys in the set may be combined and provided as a single input or as separate inputs to a cryptographic function. In one example, all of the keys in a set may be used together and if one or more of the keys in the set are unknown to the recipient computing device, the recipient computing device may be unable to successfully complete a cryptographic operation (e.g., decryption or authorization operation). In another example, a subset of the keys in the set may be used together even though one or more keys in the set are unknown or unavailable (e.g., key thresholding, key sharding). In the latter example, the quantity of keys in the subset may need to satisfy a minimum threshold number to enable the cryptographic operation to complete successfully. For example, a set may include seven keys (n=7) and the minimum threshold may be configured to be the integer value three (t=3) and if the subset has at least three of the seven keys, the content may be accessible (e.g., t of n).

Cryptographic key 126 may be used by one or more of the computing devices 110A-Z in combination with an asymmetric cryptographic system, a symmetric cryptographic system, or a combination thereof. An symmetric key cryptographic system may use the same cryptographic keys for encryption of plaintext and for decryption of ciphertext. The cryptographic keys used in a symmetric key cryptographic system may be referred to as symmetric keys and may be identical keys (e.g., copies of the same key) or there may be a simple transformation to go between keys of a symmetric key pair. The symmetric key cryptographic system may involve stream ciphers, block ciphers, other cipher, or a combination thereof. The stream ciphers may encrypt individual elements (e.g., digits, characters) of a message one at a time. Block ciphers may take a set of elements and encrypt them as a single unit and may or may not pad the resulting plaintext so that it is a multiple of a block size of n bits (e.g., 64 bit, 128 bit, 256 bit, 1024 bit). In one example, the symmetric key cryptographic system may use one or more key wrap constructions that wrap or encapsulate cryptographic key material. The constructions may be built from standard primitives such as block ciphers and cryptographic hash functions. In other examples, the symmetric key cryptographic system may be the same or similar to Advanced Encryption Standard (AES), Galois/Counter Mode (GCM), Triple Data Encryption Standard (3DES, TDES), International Data Encryption Algorithm (IDEA), Blowfish, Lattice-based cryptography, multivariate cryptography (e.g., rainbow scheme), super singular elliptic curve cryptography, super singular isogeny graphs cryptography, other cryptographic system, or a combination thereof.

An asymmetric key cryptographic system may use different keys for encryption and decryption. A first key may be used to encrypt plaintext into ciphertext and a second key may be used to decrypt the ciphertext into plaintext. The first and second keys may be referred to as an asymmetric pair and may be different keys that may or may not be mathematically related. In one example, the asymmetric key cryptographic system may be a public key cryptographic system and the first key may be a public key (e.g., shared key) and the second key may be a private key (e.g., secret key). The public key may be published and accessible to multiple computing devices and the private key may remain secret and accessible to one or more computing device associated with a particular entity (e.g., user). A public key cryptographic system may enable any device to encrypt data using the public key of a recipient computing device. The encrypted data may be decrypted with the recipient's private key.

Networks 160A-C may include one or more public networks (e.g., the internet), private networks (e.g., a local area network (LAN) or wide area network (WAN)), or a combination thereof. Networks 160A-C may include a wired or a wireless infrastructure, which may be provided by one or more wireless communications systems, such as a wireless fidelity (WiFi) hotspot connected with the networks 160A-C and/or a wireless carrier system that can be implemented using various data processing equipment, communication towers, etc. In one example, network 160A may include one or more trusted networks, network 160B may include one or more untrusted networks, and network 160C may include a subnetwork within untrusted network 160B. The subnetwork may be an untrusted or trusted network and may be shared by one or more of computing devices 110B-Z. A trusted network may include security enhanced features that restrict access and use of network 160A to particular users and devices of an organization (e.g., intranet of a business entity). An untrusted network (e.g., intranet) and may not provide the same level of security enhanced features as the trusted network and may be available for public access and use. Networks 160A-B may include one or more communication channels 162A-Z.

Communication channels 162A-Z may include any communication channel that is capable of communicating data between computing devices and may include one or more connections. The connections may be network connections, computer-to-computer connections, peripheral connection, other connections, or a combination thereof. The network connections may be over the same network or different networks and each of the network connections may be an indirect connection that traverses one or more network nodes (e.g., access points, switches, routers, or other networking infrastructure device) and may communicably couple one of computing devices with one or more other computing devices. A computer-to-computer connection may be the same or similar to a peer-to-peer connection and may be a direct connection between computing devices (e.g., bluetooth connection, WiFi Direct, ad-hoc network connection). A peripheral connection may be a connection that uses a direct physical connection between an adapter of the computer and an adapter of the portable data storage device (e.g., Universal Serial Bus (USB) connection). The peripheral connection may exist when one of the computing devices is a computer and the other is a portable data storage device (e.g., USB drive, key fob, secure card).

Communication channels 162A-Z may exist for different durations of time and at different points in time. This may occur when one of the computing devices is moved or reconfigured to communicate with other computing devices. One or more of the computing devices may be physically moved or logically moved between locations to communicate with one or more of the other computing devices (e.g., computing devices 110B-Z). Physically moving a computing device may change a physical location of the computing device and may involve transporting the computing device between geographic locations. Logically moving a computing device may change a logical location of the computing device and may involve transitioning the computing device between different virtual locations (e.g., different networks by changing network cables or settings). The physical or logical movement may be implemented or caused by the computing device. In one example, the computing device 110B may be a mobile device that includes the ability to move or other locomotion features and may be the same or similar to an autonomous vehicle (e.g., robot, drone). In another example, the computing device may be capable of being moved and may communicate with an external entity (e.g., user, robot) that can move the mobile device. In either example, the physical or logical move may transition the computing device from a first location with access to a first set of one or more computing devices to a second location with access to a second set of one or more computing devices. Computing device 110B may then use communication channels 162A-Z to communicate with the computing devices at different times and locations.

A computing device may establish one of the communication channels 162A-Z with a computing device at a first time and then remove the established communication channel before, during, or after establishing a subsequent communication channel with a second computing device. The one or more subsequent communication channels may be established sequentially or in parallel at subsequent points in time. In another example, one or more of communication channels may be a persistent communication channel and may exist before, during, and after other communication channels are established or removed. In either example, a computing device 110A (e.g., management device) may be absent a communications channel with computing device 110C-Z (e.g., devices being updated) and the absence may remain or be intermittent.

Computing devices 110C-Z may be computing devices that receive the protected content and may be referred to as recipient devices or updated devices. Each of computing device 110C-Z may correspond to at least one physical processing device that is capable of executing one or more computing operations. The term "computing device" may refer to a physical machine, a virtual machine, a container, or a combination thereof. Computing devices 110C-Z may be added to computing environment 100 with or without operating systems. A computing device without an operating system (e.g., no kernel) may be described as a bare computing device or a bare-metal computing device. A computing device without an operating system (e.g., lacking, missing, or absent an operating system) may be capable of performing a device initialization procedure (e.g., BIOS Initialization) but may or may not include a boot loader. The computing device may be added to computing environment 100 by connecting the computing device with one or more components of computing environment 100, such as, connecting the computing device to a power source, a network component, or user interface devices (e.g., keyboard and monitor).

Computing devices 110C-Z may be configured to support one or more levels of virtualization for executing program data and the levels may include hardware level virtualization, operating system level virtualization, other virtualization, or a combination thereof. The hardware level virtualization may involve a hypervisor (e.g., virtual machine monitor) that emulates portions of a physical system and manages one or more virtual machines. In contrast, operating system level virtualization may include a single operating system kernel that manages multiple isolated virtual containers. Each virtual container may share the kernel of the underlying operating system without requiring its own kernel.

Computing device 110C is an example of a computing device that provides hardware level virtualization. Computing device 110C may execute a hypervisor 132 that provides hardware resources to one or more virtual machines 134. Hypervisor 132 may be any program or combination of programs and may run directly on the hardware (e.g., bare-metal hypervisor) or may run on or within a host operating system (not shown). The hypervisor may be the same as a virtual machine monitor and may manage and monitor various aspects of the operations of the computing device, including the storage, memory, and network interfaces. The hypervisor may abstract the physical layer hardware features such as processors, memory, and I/O devices, and present this abstraction as virtual devices to a virtual machine 134 executing a guest operating system 136.

Guest operating system 136 may be any program or combination of programs that are capable of managing computing resources of virtual machine 134 and/or computing device 110C. Guest operating system 136 may include a kernel comprising one or more kernel space programs (e.g., memory driver, network driver, file system driver) for interacting with virtual hardware devices or physical hardware devices. In one example, guest operating system 136 may include Linux®, Solaris®, Microsoft Windows®, Apple Mac®, other operating system, or a combination thereof.

Computing device 110D may be similar to computing device 110C and may provide operating system level virtualization by running a computer program that provides computing resources to one or more containers 131A-B. Operating system level virtualization may be implemented within the kernel of operating system 133 and may enable the existence of multiple isolated containers. In one example, operating system level virtualization may not require hardware support and may impose little to no overhead because programs within each of the containers may use the system calls of the same underlying operating system 133. This may enable computing device 110D to provide virtualization without the need to provide hardware emulation or be run in a virtual machine (e.g., intermediate layer) as may occur with hardware level virtualization. Operating system level virtualization may provide resource management features that isolate or limit the impact of one container (e.g., container 131A) on the resources of another container (e.g., container 131B).

The operating system level virtualization may provide a pool of computing resources that are accessible by container 131A and are isolated from one or more other containers (e.g., container 131B). The pool of resources may include file system resources (e.g., particular file system state), network resources (e.g., particular network interfaces, sockets, addresses, or ports), memory resources (e.g., particular memory portions), other computing resources, or a combination thereof. The operating system level virtualization may also limit (e.g., isolate) a container's access to one or more computing resources by monitoring the container's activity and restricting the activity in view of one or more limits. The limits may restrict the rate of the activity, the aggregate amount of the activity, or a combination thereof. The limits may include one or more of file system limits, disk limits, input/out (I/O) limits, memory limits, CPU limits, network limits, other limits, or a combination thereof.

Operating system 133 may include an operating system virtualizer that may provide containers 131A-B with access to computing resources. The operating system virtualizer may wrap one or more processes (e.g., of a particular service) in a complete file system that contains the code, runtime, system tools, system libraries, and other data present on the node (e.g., a particular file system state) that can be used by the processes executing within the container. In one example, the operating system virtualizer may be the same or similar to Docker® for Linux® or Windows®, ThinApp® by VMWare®, Solaris Zones® by Oracle®, other program, or a combination thereof. In one example, the operating system virtualization may support and automate the packaging, deployment, and execution of applications inside containers (e.g., Open Shift®).

Each of the containers 131A-B may refer to a resource-constrained process space of computing device 110D that can execute functionality of the program data. Containers 131A-B may be referred to as user-space instances, virtualization engines (VE), or jails and may appear to a user as a standalone instance of the user space of operating system 133. Each of the containers 131A-B may share the same kernel but may be constrained to use only a defined set of computing resources (e.g., CPU, memory, I/O). Aspects of the disclosure can create one or more containers to host a framework or provide other functionality of a service (e.g., web application functionality, database functionality) and may therefore be referred to as "service containers" or "application containers."

Pod 135 may be a data structure that is used to organize one or more containers 131A-B and enhance sharing between the containers, which may reduce the level of isolation between containers within the same pod. Each pod may include one or more containers that share some computing resources with another container associated with the pod. Each pod may be associated with a unique identifier, which may be a networking address (e.g., IP address), that allows applications to use ports without a risk of conflict. A pod may be associated with a pool of resources and may define a volume, such as a local disk directory or a network disk and may expose the volume to one or more (e.g., all) of the containers within the pod. In one example, all of the containers associated with a particular pod may be co-located on the same computing device 110D. In another example, the containers associated with a particular pod may be located on different computing devices that are on the same or different physical machines.

Figure 2:
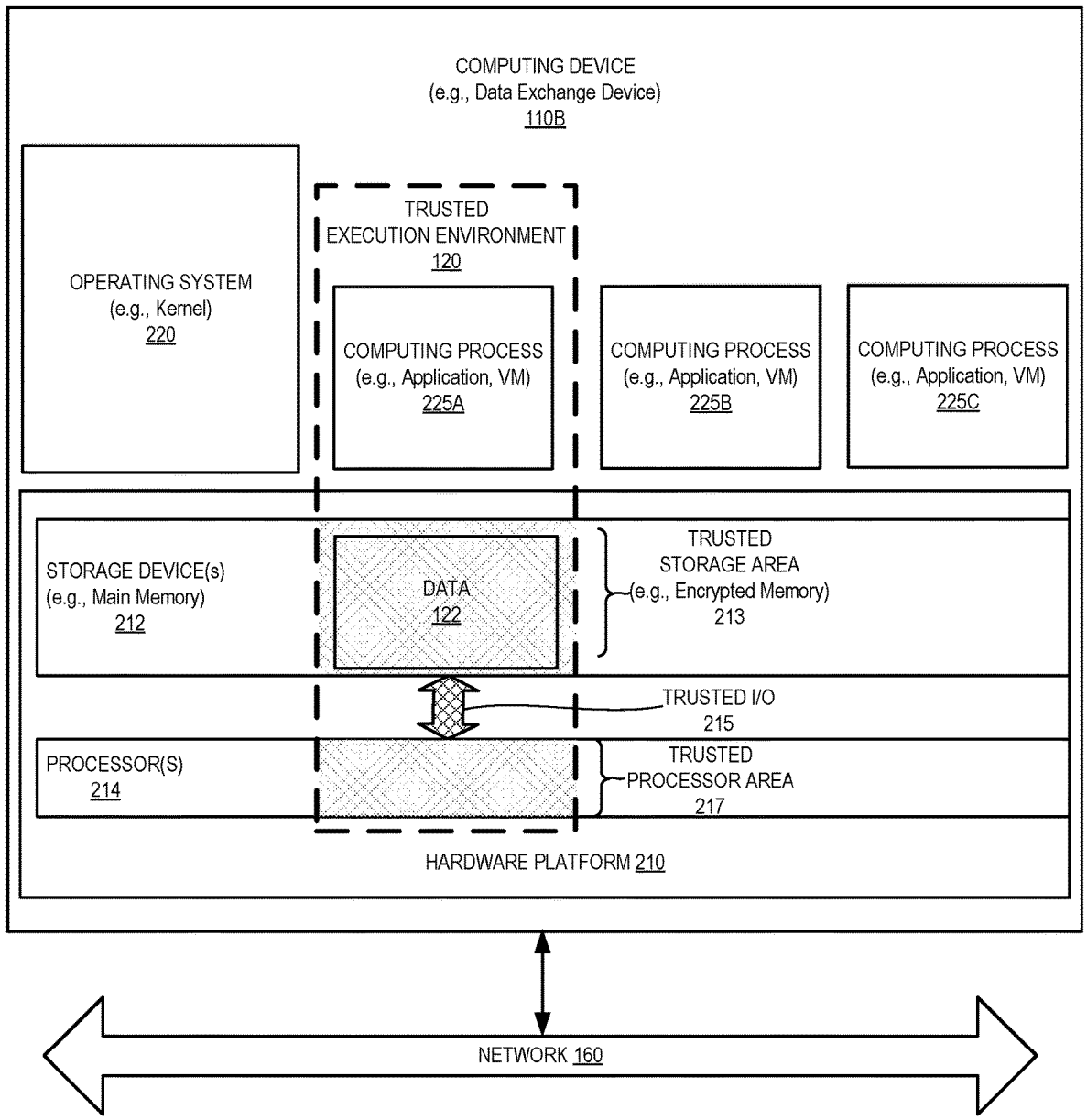
FIG. 2 depicts a block diagram of an example computing device that includes a trusted execution environment, in accordance with one or more aspects of the present disclosure.

FIG. 2 depicts an example of a trusted execution environment established in computing device 110B, in accordance with an embodiment of the present disclosure. Computing device 110B may be the same or similar to one or more of computing devices 110A-Z of FIG. 1 and may include a hardware platform 210, a trusted execution environment 120, an operating system 220, one or more computing processes 225A-C, and a network 160. It should be noted that other architectures for computing device 110B are possible, and that the implementations of the computing device utilizing embodiments of the disclosure are not necessarily limited to the specific architecture depicted.

Hardware platform 210 may include one or more hardware devices that perform computing tasks for computing device 110B. Hardware platform 210 may include one or more data storage devices, computer processors, Basic Input Output services (BIOS), code (e.g., firmware), other aspects, or a combination thereof. One or more devices of the hardware platform 210 may be combined or consolidated into one or more physical devices or may partially or completely emulated as a virtual device or virtual machine. In the example in FIG. 1, hardware platform 210 may include one or more storage devices 212 and processors 214.

Storage devices 212 may include any data storage device that is capable of storing data and may include physical memory devices. The physical memory devices may include volatile memory devices (e.g., RAM, DRAM, SRAM), non-volatile memory devices (e.g., NVRAM), other types of memory devices, or a combination thereof. Storage devices 212 may also or alternatively include mass storage devices, such as hard drives (e.g., Hard Disk Drives (HDD)), solid-state storage (e.g., Solid State Drives (SSD)), other persistent data storage, or a combination thereof. Storage devices 212 may be capable of storing data 122 associated with one or more of the computing processes 225A-C. In one example, data of computing process 225A may be received from a device that is internal or external to computing device 110B. The data may be encrypted using a cryptographic key that was provided (e.g., determined, derived, generated, assigned) by computing device 110B or by a different computing device. The received data may be decrypted using the same cryptographic key or a derivative of the cryptographic key and the decrypted data may be loaded into the trusted execution environment 120 (as shown by data 122) before, during or after being re-encrypted.

Processors 214 may be communicably coupled to storage devices 212 and be capable of executing instructions encoding arithmetic, logical, or I/O operations. Processors 214 may include one or more general processors, Central Processing Units (CPUs), Graphical Processing Units (GPUs), Application Specific Integrated Circuits (ASICs), secure cryptoprocessors, Secure Elements (SE), Hardware Security Module (HSM), other processing unit, or a combination thereof. Processors 214 may be a single core processor, which may be capable of executing one instruction at a time (e.g., single pipeline of instructions) or a multi-core processor, which may simultaneously execute multiple instructions. Processors 214 may interact with storage devices 212 and provide one or more features defined by or offered by trusted systems, trusted computing, trusted computing base (TCB), trusted platform module (TPM), hardware security module (HSM), secure element (SE), other features, or a combination thereof.

Processors 214 may establish a trusted execution environment across multiple hardware devices of hardware platform 210 (e.g., processor and storage devices) and may include instructions (e.g., opcodes) to initiate, configure, and maintain the trusted execution environment 120. In one example, a trusted execution environment may be implemented using Software Guard eXtensions® (SGX) provided by Intel®, Memory Encryption Technology provided by AMD® (e.g., Secure Encrypted Virtualization® (SEV), Secure Memory Encryption (SME, SME-ES), TrustZone® provided by ARM®, IBM PEF, RISC-V Sanctum, other technology, or a combination thereof.

Trusted execution environment 120 may be a security enhanced area in computing device 110B that may guard the data of a computing process from being accessed by other computing processes on computing device 110B. A trusted execution environment may enhance security by enhancing confidentiality (e.g., reducing unauthorized access), integrity (e.g., reduce unauthorized modifications), availability (e.g., enable authorized access), non-repudiation (e.g., action association), other aspect of digital security or data security, or a combination thereof. Trusted execution environment 120 may be the same or similar to a trust domain, trust zone, other term, or a combination hereof. Trusted execution environment 120 may protect data 122 while data 122 is in use (e.g., processed by processor 214), is in motion (e.g., transmitted over network 160), is at rest (e.g., stored in storage device 212), or a combinational thereof. Trusted execution environment 120 may be a set of one or more trusted execution environments and each of the trusted execution environments may be referred to as an instance of a trusted execution environment (i.e., TEEi). Each trusted execution environment 120 may isolate data of at least one process executed in trusted execution environment 120 from processes executing external to the trusted execution environment. The at least one process may be a set of one or more processes associated with an execution construct being guarded by the trusted execution environment 120.

The execution construct may be a virtual machine, container, computing process, thread, instruction stream, or a combination thereof. In one example, trusted execution environment 120 may execute a particular virtual machine (e.g. VM based TEE) and may guard data of the virtual machine from a hypervisor managing the virtual machine. In this example, computing device 110B may execute executable code in trusted execution environment 120 as a virtual machine process and the executable code in the trusted execution environment may be accessible to the virtual machine process and inaccessible to a hypervisor managing the virtual machine process. As such, the trusted execution environment 120 of computing device may host a virtual machine that executes the executable data and all the data in the trusted execution environment may be accessible to the virtual machine and inaccessible to a hypervisor managing the virtual machine.

In another example, trusted execution environment 120 may be associated with a particular computing process (e.g., process based TEE) and may guard data of the particular computing process from being access by other equally privileged, higher privileged, or lower privileged computing processes (e.g., guard application process against higher privileged Operating System (OS) process). In this example, computing device 110 may execute the executable code in trusted execution environment 120 as one or more application processes and the executable code in the trusted execution environment 120 may be accessible to the one or more application processes and inaccessible to a kernel managing the one or more application processes. As such, trusted execution environment 120 of computing device 110B may host one or more application processes that execute the executable data and the data in the trusted execution environment may be accessible to the one or more application processes and be inaccessible to a kernel managing the one or more application processes. In either example, the data in the trusted execution environment 120 may be guarded by storing the data 122 in a trusted storage area 213.

Trusted storage area 213 may be an area of one or more storage devices 212 that stores data of a computing process. As shown in FIG. 1, trusted storage area 213 may be a part of trusted execution environment 120 and may store data 122 of computing process 225A in an encrypted form. Data 122 may be encrypted and decrypted by hardware devices using cryptographic input that includes one or more cryptographic keys. In one example, the cryptographic keys may be accessible to the hardware devices (e.g., processor 214) and may be inaccessible to operating system level processes executed by the hardware device. In another example, the cryptographic keys may be accessible to hardware devices and one or more computing processes, such as, the computing process associated with the trusted execution environment. In either example, the encryption and decryption performed by the hardware device may be referred to as hardware based encryption, hardware level encryption, hardware assisted encryption, hardware enforced encryption, process transparent encryption, other term, or a combination thereof and may use cryptographic key data (e.g., encryption and decryption keys) that are accessible to the processor and are inaccessible to all processes executed external to the trusted execution environment 120.

Trusted storage area 213 may include a portion of memory and may be referred to as an encrypted memory area. An encrypted memory area may be a contiguous or non-contiguous portion of virtual memory, logical memory, physical memory, other storage abstraction, or a combination thereof. The encrypted memory area may correspond to or be mapped to a portion of primary memory (e.g., main memory), auxiliary memory (e.g., solid state storage), adapter memory (e.g., memory of graphics card, or network interface cart), other persistent or non-persistent storage, or a combination thereof. In one example, the encrypted memory area may be a portion of main memory associated with a particular process and the processor may encrypt the data when storing the data in the memory area and may decrypt the data when retrieving the data from the memory area. The data in the memory area may be transformed (e.g., encrypted or decrypted) before, during, or after it is stored in or retrieved from the memory area and may remain in an encrypted form while in the encrypted memory area.

Trusted storage area 213 may store the data in one or more storage units. The storage units may be logical or physical units of data storage for managing the data (e.g., storing, organizing, or accessing the data). A storage unit may include a contiguous or non-contiguous sequence of bytes or bits. In one example, a storage unit may be a virtual representation of underlying physical storage units, which may be referred to as physical storage blocks. Storage units may have a unit size that is the same or different from a physical block size provided by an underlying hardware resource. The storage unit may include volatile or non-volatile data storage. In one example, storage units may be a memory segment and each memory segment may correspond to an individual memory page, multiple memory pages, or a portion of a memory page. In other examples, each of the storage units may correspond to a portion (e.g., block, sector) of a mass storage device (e.g., hard disk storage, solid state storage). The data in the storage units of trusted storage area 213 may be transmitted to other hardware devices using trusted IO 215.

Trusted IO 215 may enable the data of a computing process to be transmitted between hardware devices in a security enhanced manner. The data may be transmitted over one or more system buses, networks, or other communication channel in an encrypted or partially encrypted form. This may be advantageous because transmitting the data in an encrypted form may limit the ability of the data to be snooped while being transmitted between hardware devices. As shown in FIG. 2, trusted IO 215 may enable the data of computing process 225A to be transmitted between trusted storage area 213 and trusted processor area 217.

Trusted processor area 217 may be a portion of processor 214 that is associated with computing process 225A and guards data of computing process 225 from being accessed or modified by computing processes 225B-C. Trusted processor area 217 may include a portion of processor 214 that stores the data (e.g., CPU cache, processor memory or registers) and a portion of processor 214 that executes the data (e.g., processor core). Trusted processor area 217 may store the data in an encrypted form or in a decrypted form when it is present on the processor and in either example, the data of the computing process may be protected from being accessed or modified by other processes via the design of the processor and encryption may not be required to ensure isolation of the data when the data is within the processor packaging (e.g., chip packaging).

Computing device 110B may use the same processor and storage device to establish multiple instances of trusted execution environment 120. Each instance of a trusted execution environment (e.g., TEE instance, TEEi) may be established for a particular set of one or more computing processes and may be associated with a particular memory encrypted area. The instances of a trusted execution environment may be provided by the same hardware (e.g., processor and memory) but each instance may be associated with a different memory encrypted area and a different set of one or more processes (e.g., set including an individual process or set of all processes of a VM). Each instance may guard all data of a computing process or a portion of the data of a computing process. For example, computing process 225A (e.g., application or VM) may be associated with both a trusted execution environment and an untrusted execution environment. In this situation, a first portion of the data of computing process 225A may be stored and/or executed within trusted execution environment 120 and a second portion of the data of computing process 225A may be stored and/or executed within an untrusted execution environment. The second portion may be stored in the same storage device as the first portion but the second portion may be stored in a decrypted form and may be executed by processor 214 in a manner that enables another process (e.g., multiple higher privileged processes) to access or modify the data. In either example, trusted execution environment may be used to execute one or more of the computing processes 225A-C.

Each of the computing processes 225A-C may include one or more streams of execution for executing programmed instructions. A stream of instructions may include a sequence of instructions that can be executed by one or more processors. Each of the computing processes may be managed by an operating system 220 or may part of an operating system (e.g., kernel, not shown). In one example, a computing process may be an instance of a computer program that is being executed and may contain program code (e.g., executable code, executable data) and a state of the current activity. Multiple computing processes may be executed concurrently by a processing device that supports multiple processing units. The processing units may be provided by multiple processors or from a single processor with multiple cores or a combination thereof. A computing process may include one or more computing threads, such as a system thread, user thread, or fiber, or a combination thereof. A computing process may include a thread control block, one or more counters and a state (e.g., running, ready, waiting, start, done).

Computing processes 225A-C may correspond to one or more applications, containers, virtual machines, or a combination thereof. Applications may be programs executing with user space privileges and may be referred to as application processes, system processes, services, background processes, or user space processes. A user space process (e.g., user mode process, user privilege process) may have lower level privileges that provide the user space process access to a user space portion of data storage without having access to a kernel space portion of data storage. In contrast, a kernel process may have higher privileges that provide the kernel process access to a kernel space portion and to user space portions that are not guarded by a trusted execution environment. In one example, the privilege associated with a user space process may change during execution and a computing process executing in user space (e.g., user mode, user land) may be granted enhanced privileges by an operating system and function in kernel space (e.g., kernel mode, kernel land). This may enable a user space process to perform an operation with enhanced privileges. In another example, the privilege associated with a user space process may remain constant during execution and the user space process may request an operation be performed by another computing process that has enhanced privileges (e.g., operating in kernel space).

The privilege levels of a computing process may be the same or similar to protection levels of processor 214 (e.g., processor protection rings) and may indicate an access level of a computing process to hardware resources (e.g., virtual or physical resources). There may be multiple different privilege levels assigned to the computing process. In one example, the privilege levels may correspond generally to either a user space privilege level or a kernel privilege level. The user space privilege level may enable a computing process to access resources assigned to the computing process but may restrict access to resources assigned to another user space or kernel space computing process. The kernel space privilege level may enable a computing process to access resources assigned to other kernel space or user space computing processes. In another example, there may be a plurality of privilege levels, and the privilege levels may include a first level (e.g., ring 0) associated with a kernel, a second and third level (e.g., ring 1-2) associated with device drivers, and a fourth level (e.g., ring 3) that may be associated with user applications.

Operating system 220 may include one or more programs that are run to manage one or more of the computing processes 225A-C. Operating system 220 may include a kernel that execute as one or more kernel processes and may manage access to physical or virtual resources provided by hardware devices. A kernel process may be an example of a computing process associated with a higher privilege level (e.g., hypervisor privilege, kernel privilege, kernel mode, kernel space, protection ring 0). In one example, operating system 220 may be a host operating system, guest operating system, or a portion thereof and the computing processes 225A-C may be different applications that are executing as user space processes. In another example, operating system 220 may be a hypervisor that provides hardware virtualization features and the computing processes 225A-C may be different virtual machines. In yet another examples, operating system may include a container runtime (e.g., Docker, Container Linux) that provides operating system level virtualization and the computing processes 225A-C may be different containers. In further examples, operating system 220 may provide a combination thereof (e.g., hardware virtualization and operating system level virtualization).

The kernel of operating system 220 may segregate storage devices 212 (e.g., main memory, hard disk) into multiple portions that are associated with different access privileges. At least one of the multiple portions may be associated with enhanced privileges and may be accessed by processes with enhanced privileges (e.g., kernel mode, kernel privilege) and another portion may be associated with diminished privileges and may be accessed by processes with both diminished privileges (e.g., user space mode, user space privilege) and those with enhanced privileges. In one example, the portion of storage devices 212 associated with the enhanced privileges may be designated as kernel space and the portion of storage devices 212 associated with the diminished privileges may be designated as user space. In other examples, there may be more or less than two portions.

When the kernel provides features of a hypervisor it may also be known as a virtual machine monitor (VMM) and may provide virtual machines with access to one or more features of the underlying hardware devices. A hypervisor may run directly on the hardware of computing device 110B (e.g., host machine) or may run on or within a host operating system (not shown). The hypervisor may manage system resources, including access to hardware devices. The hypervisor may be implemented as executable code and may emulate and export a bare machine interface to higher-level executable code in the form of virtual processors and guest memory. Higher-level executable code may comprise a standard or real-time operating system (OS), may be a highly stripped down operating environment with limited operating system functionality and may not include traditional OS facilities, etc.

Figure 3:
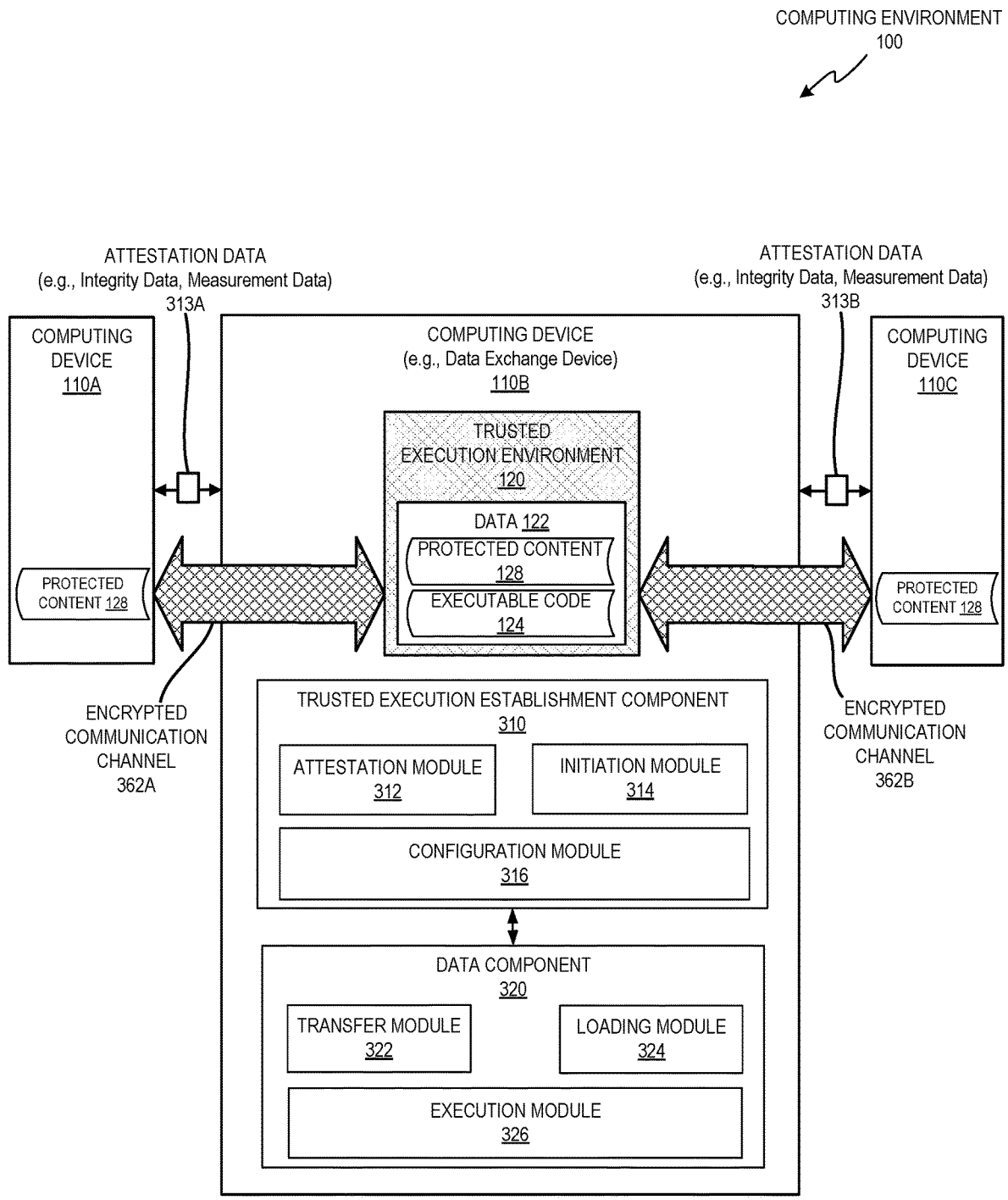
FIG. 3 depicts a block diagram of an example computing device with one or more components and modules for establishing a trusted execution environment, in accordance with one or more aspects of the present disclosure.

FIG. 3 depicts a block diagram illustrating portions of computing environment 100 and emphasizes the interaction with trusted execution environment 120. Computing device 110B may function as a data exchange device and may receive protected content 128 from computing device 110A and distributed it to computing device 110C. In the example shown, computing device 110B may include a trusted execution establishment component 310 and a data component 320. The components and modules discussed herein may be performed by any portion of a computing device. For example, one or more of the components or modules discussed below may be performed by processor circuitry, processor firmware, a driver, a kernel, an operating system, an application, other program, or a combination thereof. More or less components or modules may be included without loss of generality. For example, two or more of the components may be combined into a single component, or features of a component may be divided into two or more components. In one implementation, one or more of the components may reside on different computing devices.

Trusted execution establishment component 310 may enable computing device 110B to establish one or more trusted execution environments 120 in computing device 110B. Establishing a trusted execution environment may involve creating a new trusted execution environment or updating an existing trusted execution environment. Each of the one or more trusted execution environments may be associated with a set of one or more computing processes and may store and execute data of the set of computing processes. In one example, trusted execution establishment component 310 may include an attestation module 312, an initiation module 314, and a configuration module 316.

Attestation module 312 may enable computing device 110B to perform an attestation to verify the integrity of computing device 110B (e.g., integrity of hardware platform 210, operating system 220, and/or one or more computer processors 214A-C). Attestation may enable a program to check the capabilities of computing device 110B and to detect unauthorized changes to programs, hardware devices, other portions of computing device, or a combination thereof. The unauthorized changes may be the result of malicious, defective, or accidental actions by a program or hardware device. The attestation may involve performing local attestation, remote attestation, or a combination thereof. Local attestation may involve enabling a program executed locally on computing device 110B to verify the integrity of computing device 110B. Remote attestation may involve enabling a program executed remotely on a different computing device (e.g., 110A, 110C-Z) to verify the integrity of computing device 110B. The remote attestation may be performed non-anonymously by disclosing data that uniquely identifies computing device 110B or anonymously without uniquely identifying computing device 110B (e.g., Direct Anonymous Attestation (DAA)). In either example, attestation module 312 may perform one or more attestation operations to determine attestation data 122A-B and may transmit attestation data 122A-B to the programs executing on the local or remote computing devices for verification.

Attestation data 313A-B may be based on the configuration of computing device 110B and may represent the capabilities of the hardware platform, trusted execution environment, executable code, or a combination thereof. Attestation data obtained or generated by the hardware platform (e.g., processor, memory, firmware, BIOS) and be the same or similar to integrity data (e.g., hash or signature of executable code), identification data (e.g., processor model or instance), cryptographic data (e.g., signature keys, endorsement keys, session keys, encryption or decryption keys, authentication keys), measurement data, report data, configuration data, settings data, other data, or a combination thereof. In one example, determining the attestation data may involve attestation chaining in which attestation data of different portions of computing device 110B may be combined before, during, or after being obtained. This may involve determining attestation data for one or more layers of the computing device 110B and the layers may correspond to hardware device layer (e.g., hardware platform attestation data), program layer (e.g, code attestation data), other layer, or a combination thereof.

The program that receives the attestation data may use the attestation data to verify the capabilities of computing device 110B. The program may execute a verification function to verify the computing device 110B in view of the attestation data. The verification function may take as input the attestation data and provide output that indicates whether the computing device 110B is verified (e.g., trusted). In one example, the attestation data may include integrity data (e.g., a message authentication code (MAC)) and the verification function may analyze a portion of attestation data to generate validation data. The verification function may then compare the received integrity data with the generated validation data to perform the attestation (e.g., compare received MAC with generate MAC).

Attestation module 312 may perform operations before, during, or after the trusted execution environment is established on computing device 110B and may provide attestation data that is specific to the initiation, configuration, or execution of the trusted execution environment 120. In one example, attestation may involve performing a key exchange between the hardware platform of computing device 110B and a remote computing device (e.g., Diffie-Hellman Key Exchange), establish hardware root of trust, and/or provide measurement and configuration values of trusted execution environment 120 to the remote computing devices.

Initiation module 314 may enable computing device 110B to initiate the configuration of a trusted execution environment before, during, or after the execution of attestation module 312. Initiation module 314 may execute one or more instructions recognized by the processor (e.g., Intel SGX opcodes, AMD SEV opcodes). The instructions may be called by a program associated with an application, kernel, operating system, hypervisor, bootloader, Basic Input Output Services (BIOS), hardware adapter, other entity, or a combination thereof. In one example, a program that will execute in the trusted execution environment may initiate the creation of the trusted execution environment. In another example, a program may initiate the creation of the trusted execution environment and the trusted execution environment may be used for executing another program. In either example, after the trusted execution environment is initiated it may be configured by configuration module 316.

Configuration module 316 may enable computing device 110B to configure a trusted execution environment to store or execute data of a computing process (e.g., application or virtual machine). Configuration module 316 may configure the trusted execution environment in view of configuration data provided by a process initiating or using the trusted execution environment, by a processor, storage device, other portion of computing device 110, or a combination thereof. The configuration data may be provided as input before, during, or after the trusted execution environment is initiated, created, or updated. As discussed above, a trusted execution environment may include a trusted storage area, a trusted processor area, trusted IO, or a combination thereof and the configuration data may include data for configuring one or more of these. For example, configuration data may include an execution construct data (e.g., processes identifier (PID), virtual machine identifier (VMID)), a storage data (e.g., storage size or location), cryptographic data (e.g., encryption key, decryption key, seed, salt, nonce), other data, or a combination thereof. One or more of these may be configured or customize and associated with the trusted execution environment for the computing process. In one example, the trusted execution environment may include an encrypted storage area and the configuration data may indicate a size of the encrypted storage area that will be allocated to store the computing processes (e.g., size of virtual memory for a trusted storage area).

Configuration module 316 may configure different aspects of the trusted execution environment to use different cryptographic techniques. The different cryptographic techniques may use different cryptographic functions, cryptographic settings, cryptographic keys, cryptographic inputs, other cryptographic data, or a combination thereof. In one example, data of a computing process that will be executed by the trusted execution environment 120 may be encrypted using a first cryptographic technique (e.g., encrypted using a location independent transport key) when loaded by the processor and may be encrypted using a second cryptographic technique (e.g., encrypted using a location dependent storage key) when stored in the encrypted storage area. This may be advantageous because the data may be more vulnerable to attack when it is stored on a removable storage device (e.g., memory module) then when it is transferred over the system bus and therefore different cryptographic techniques may be used.

Data component 320 may enable computing device 110B to load data 122 of a computing process into trusted execution environment 120 to enhance the confidentiality and integrity of the data. Data 122 may include protected content 128 (e.g., executable image data), executable code 124 (e.g., access control logic), non-executable data (e.g., configuration data, parameter values, settings files), other data, or a combination thereof. In one example, data component 320 may include a transfer module 322, a loading module 324, and an execution module 326.

Transfer module 322 may enable computing device 110B to transfer protected content 128 into trusted execution environment 120 and between computing devices without exposing the protected content 128 to processes running external to trusted execution environment 120. Transfer module 322 may transmit protected content 128, received protected content 128, or a combination thereof. In one example, transfer module 322 may transfer protected content 128 to or from an external device (e.g., remote computing device) that is accessible over an external connection (e.g., network, internet, ethernet, or cellular connection) using a network adapter. The network adapter may write the data directly to memory of computing device 110B (e.g., Direct Memory Access (DMA)) or may provide the data to the processor and the processor may write the data to memory. In another example, transfer module 322 may transfer protected data 122 to or from an internal device (e.g., hard drive) that is accessible over an internal connection (e.g., internal data bus). In either example, protected content 128 may be transferred over one or more encrypted communication channels 362A-B.

Encrypted communication channels 362A-B may be security enhanced communication channels that connect trusted execution environment 120 of computing device 110B with one or more remote computing devices (e.g., 110A and 110C). Each of the encrypted communication channels 362A-B may be established by the hardware platform (e.g., processor) and may encrypt the data that is transferred over the encrypted communication channel using hardware based encryption so that the data is accessible to the hardware platform and trusted execution environment 120 without being accessible to any process executed external to the trusted execution environment 120. As such, when transfer module 322 sends or receives protected content 128 it may be accessible to the hardware platform of computing device 110B in a decrypted form without being accessible to the operating system of computing device 110B in the decrypted form (i.e., access to encrypted form or no access at all)

Loading module 324 may include instructions for loading data into trusted execution environment 120. Loading data 122 may involve copying data, moving data, updating data, modifying data, or other action affecting data 122. The process of loading data 122 may involve copying data into the trusted processor area from the trusted storage area, copying data into the trusted storage area from an untrusted area, other copy operation, or a combination thereof. Trusted execution environment 120 may store the data of the computing process in the encrypted storage area and the loading may involve the processor receiving the data in an encrypted form over a bus from the encrypted storage area (e.g., retrieving data via trusted IO). The trusted execution environment 120 may include or be associated with a particular portion of memory (e.g., specific range of addresses) and a particular portion of the processor (e.g, particular core) and the data that is loaded into the trusted execution environment 120 may be accessible to the computing process and inaccessible to the kernel prior to the enabling.

Execution module 326 may enable computing device 110B to cause executable code 124 to execute in the trusted execution environment 120. As discussed in regards to FIG. 2, computing device 110B may include an operating system that manages the execution of multiple computing processes. Execution module 326 may be a part of the operating system or interact with the operating system to initiate the execution of executable code 124 as a computing process. Although the operating system may not have access to a decrypted version of the data in trusted execution environment 120, it may be able to manage when the computing process executes and the operations it performs. The operations executed by the executable code 124 in the trusted execution environments are discussed in more detail in regards to FIG. 4-5 (e.g., operations and control logic).

Figure 4:
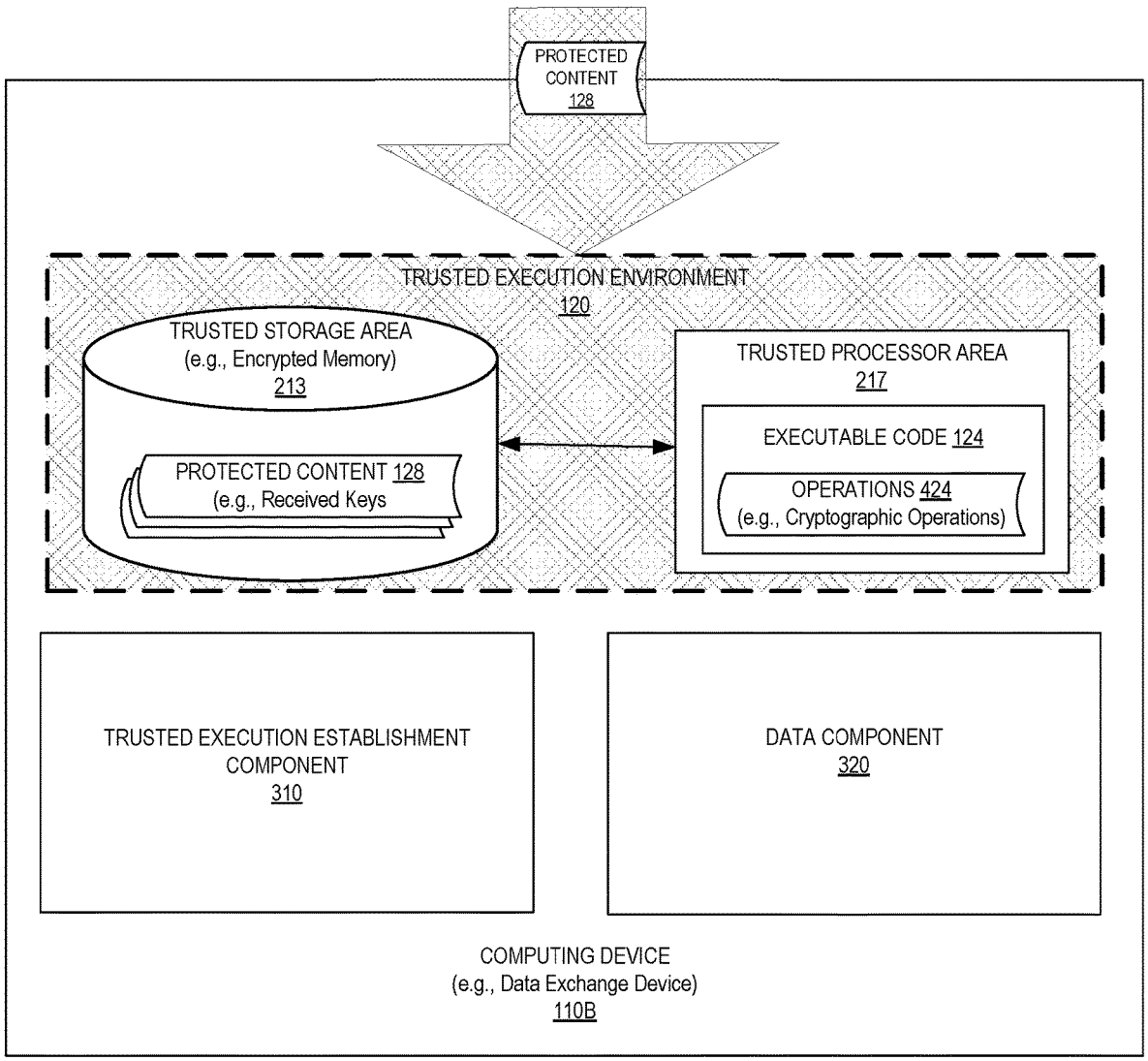
FIG. 4 depicts a block diagram of a computing device that uses a trusted execution environment to retrieve protected content from another computing device, in accordance with one or more aspects of the present disclosure.

FIG. 4 depicts a block diagram illustrating an exemplary computing device 110B that is configured to perform data retrieval 140 to retrieve protected content from one or more other computing devices, in accordance with one or more aspects of the present disclosure. The one or more computing devices may provide protected content 128 to the trusted execution environment 120 of computing device 110B so that computing device 110B can provide it to one or more other computing devices using the trusted execution environment 120. The use of trusted execution environment 120 may be particularly advantageous because it enables each of the one or more other computing devices to establish a security enhanced connection with the trusted execution environment of computing device 110B and share the protected content with the trusted execution environment without exposing the protected content to any programs running external to the trusted execution environment (e.g., on computing device 110B or the other computing devices). Computing device 110B may establish trusted execution environment 120 to store protected content 128 and to execute executable code 124 to control access to protected content 128.

Protected content 128 may include content that is transferred to computing device 110B at different times and from different locations. In the example shown in FIG. 4, a first content item of the protected content 128 (e.g., first image file) may be received from a first computing device at a first time and a second content item of protected content 128 (e.g., second image file) may be received from second computing device at a second time. The first and second computing devices may be referred to as data origination devices and may be management devices or storage devices and may or may not be previously authenticated. There may be any number of protected content items and origination devices and each transferring device may transfer one or more content items.

Executable code 124 may implement one or more operations 424 that are used to access protected content 128, restrict access to protected content 128, or a combination thereof. Operations 424 may involve establishing a connection, performing an encryption operation, other action, or a combination thereof. The encryption operation may enable computing device 110B to decrypt or encrypt protected content 128A-Z using cryptographic key 126. Establishing a connection may enable computing device 110B to establish a communication channel to receive or provide protected content 128. The communication channel may be the same or similar to the communication channels 162A-Z of FIG. 1 or encrypted communication channels 362A-B of FIG. 3 and may enable communication with another device (e.g., data store or computing device). Establishing the communication channel may involve using a cryptographic key to authenticate computing device 110B by authenticating or authorizing process, device, user, interface, address, port, socket, other computing attribute, or a combination thereof. In one example, executable code 124 may access a session key and use the session key to establish a communication channel (e.g., TLS or IPSec connection) for accessing protected content 128. One or more of operations 424 may execute internal to trusted execution environment 120, external to trusted execution environment 120, or a combination thereof.

Figure 5:
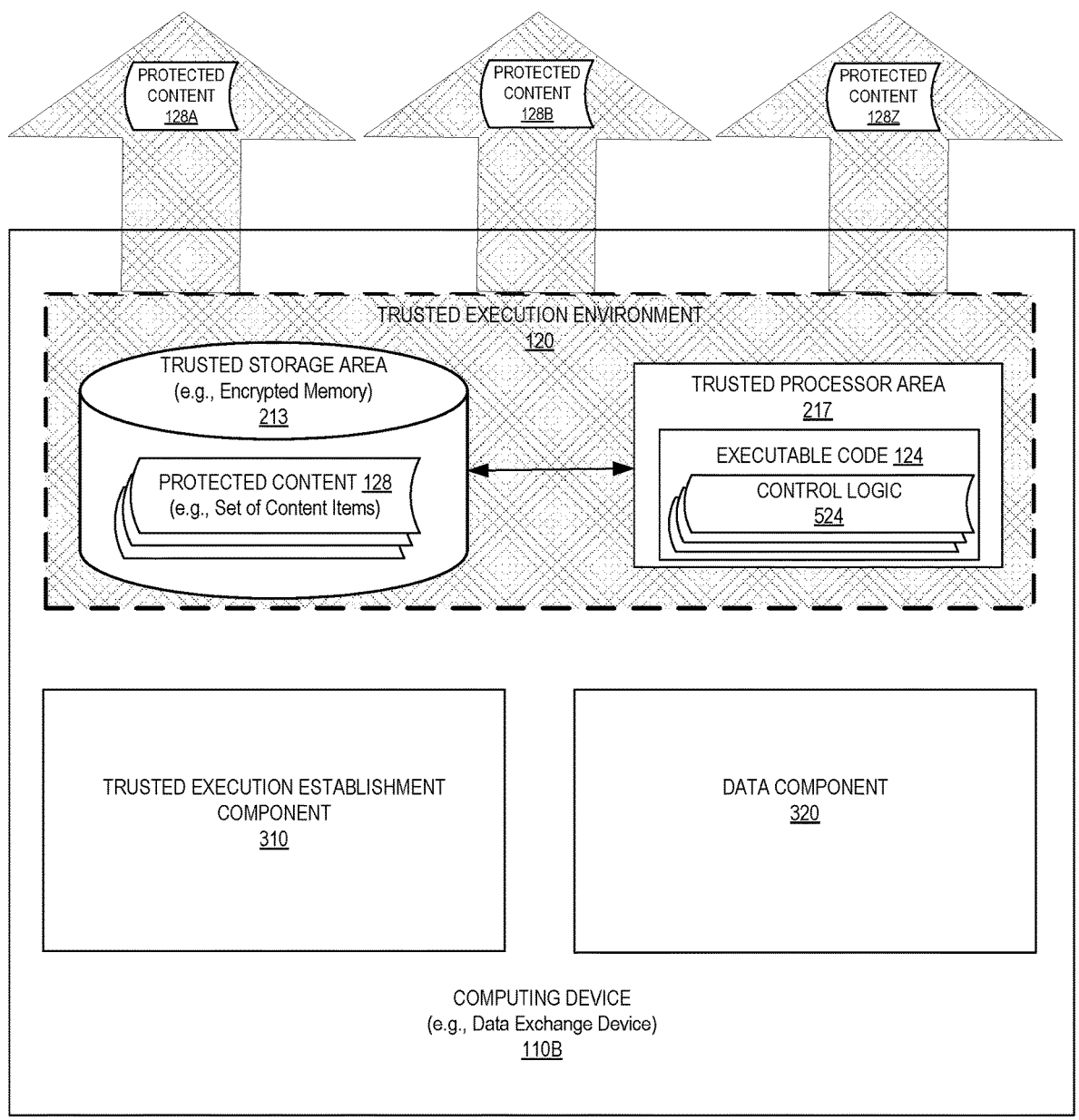
FIG. 5 depicts a block diagram of a computing device that uses a trusted execution environment to distribute protected content to a set of one or more computing devices, in accordance with one or more aspects of the present disclosure.

FIG. 5 depicts a block diagram illustrating an exemplary computing device 110B that is configured to perform data distribution 150, in accordance with one or more aspects of the present disclosure. Computing device 110B may include a trusted execution environment 120 that is loaded with executable code 124 and protected content 128. Protected content 128 may be the same or similar to protected content 128 of FIG. 1 and may include a set of one or more content items that are distributed to one or more computing devices 110C-Z. The content items may be distributed to different locations at different times or distributed to the same or similar locations and times (e.g., same host machine). In the example shown in FIG. 5, protected content 128 may include protected content 128A (e.g., first image file), protected content 128B (e.g., second image file), and protected content 128C (e.g., third image file). There may be any number of content items or computing devices and a particular content item may be sent to more than one computing device and multiple content items may be sent to the same computing device. The manner in which protected content 128 is distributed may be determined by executable code 124.

Executable code 124 may include control logic 524 that controls what, when, where, and/or how protected content 128 is distributed by computing device 110B. Executable code 124 may be the same or similar to executable code 124 of FIG. 1 and FIG. 4 and may include data corresponding to recipient device data (e.g., device or user names), temporal data (e.g., times or durations), location data (e.g., logical or geographic locations), other data, or a combination thereof. Control logic 524 may include logic that is common to multiple recipient devices, control logic that is specific to one or more of the recipient devices, or a combination thereof. For example, the control logic executed for one of the recipient devices may be different from the control logic executed for another recipient device. Control logic 524 implemented by executable code 124 may control communication, authentication, or access to protected content 128A-Z.

Controlling communication may involve the executable code 124 requesting, responding, or monitoring communications with recipient devices (e.g., computing devices 110C-Z). The communication with the recipient devices may occur over non-encrypted communication channels, encrypted communication channels, or a combination thereof. In one example, executable code 124 may initiate or register a monitor on computing device 110B that listens for connections to recipient devices and enables the recipient devices to communicate with the computing process executing executable code 124 in the trusted execution environment 120.

Controlling authentication may involve the executable code 124 executing in the trusted execution environment 120 to provide one or more authentication requests, authentications responses, or a combination thereof. The authentication may be based on a single factor authentication or multiple factor authentication. The authentication requests or responses may include authentication data provided to computing device 110B from the management device (e.g., 110A), a data storage device (e.g., 114), a recipient device (e.g., 110C-Z). The authentication data may include an identity of the data exchange device or recipient device (e.g., device ID) or a user of the data exchange device (e.g., user ID), or a combination thereof. The authentication data may also or alternatively include particular sensor data (e.g., location), system data (e.g., time), credentials (e.g., account and password), cryptographic key data, questions, answers, tests, proof-of-work tasks, other data, or a combination thereof. Control logic 524 may use or evaluate the authentication data to authenticate the recipient device and provide access to some or all of the protected content 128.

Controlling access may involve the executable code executing in trusted execution environment to provide the set of one or more recipient devices with access to protected content 128. In one example, providing a recipient device with access to a particular portion of protected content (e.g., protected content 128A, 128B, or 128C) may involve the trusted execution environment executing the executable code to transmit the protected content over a communication channel to the recipient device. In another example, providing a recipient device with access to a particular portion of protected content may involve trusted execution environment 120 executing executable code 124 to decrypt and store the protected content in a storage location that is accessible to the recipient device. The storage location may be on computing device 110B, on the recipient device, or on another computing device (e.g., network storage device).

Control logic 524 of executable code 124 may determine an order that protected content 128 is distributed to the recipient devices in the set. The order may be indicated by the data received from the originating device and may be embedded in control logic 524. A violation of the order may result in the control logic 524 performing one or more actions. The actions may include or involve providing a message to the recipient device (e.g., error, warning, or information message), a termination of the code executing in the trusted execution environment, providing invalid data (e.g., duress data, un-decryptable data, null data), other action, or a combination thereof.

Figure 6:
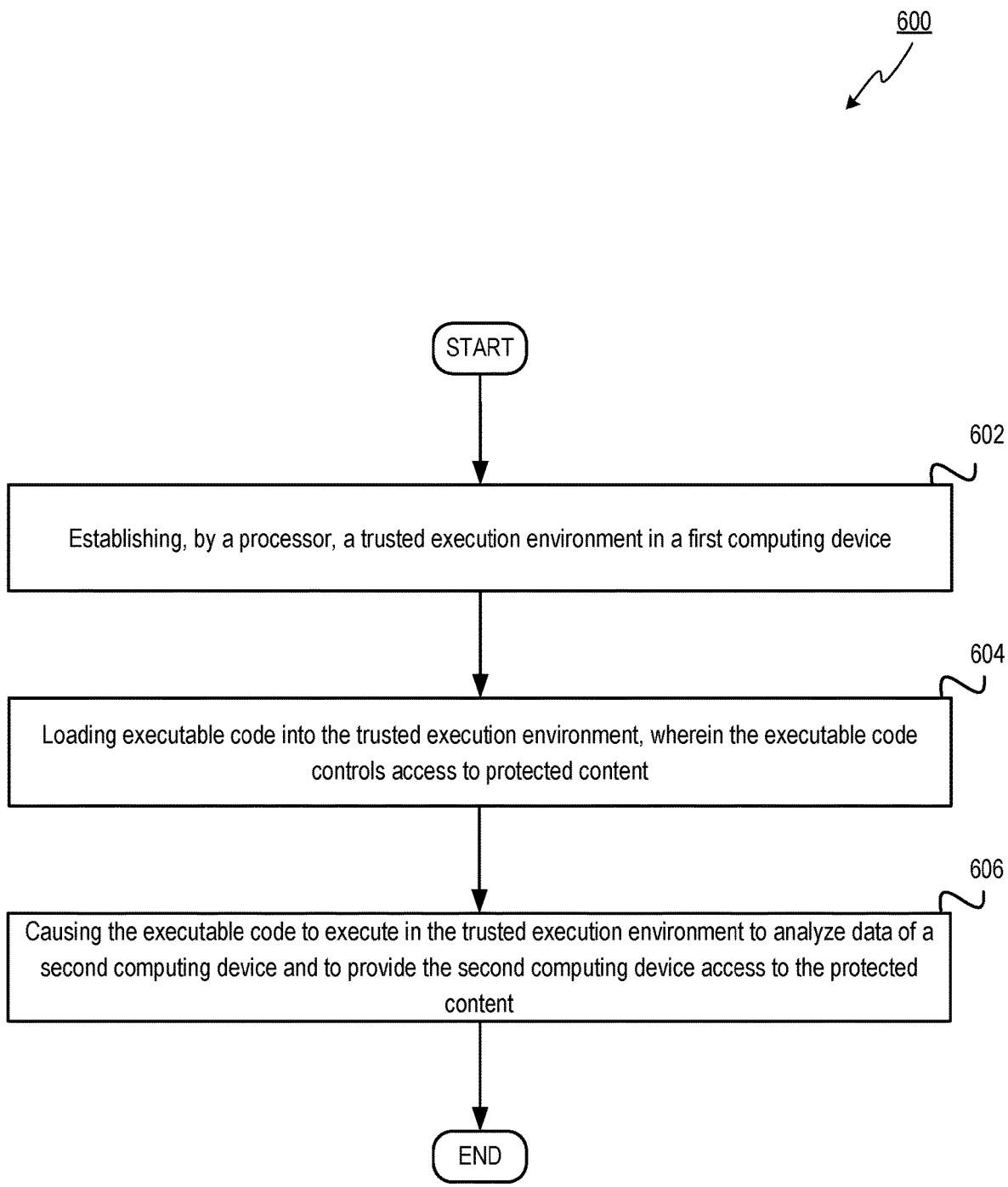
FIG. 6 depicts a flow diagram of a method performed by a computing device to store and distribute protected content to one or more computing devices, in accordance with one or more aspects of the present disclosure.
Figure 7:
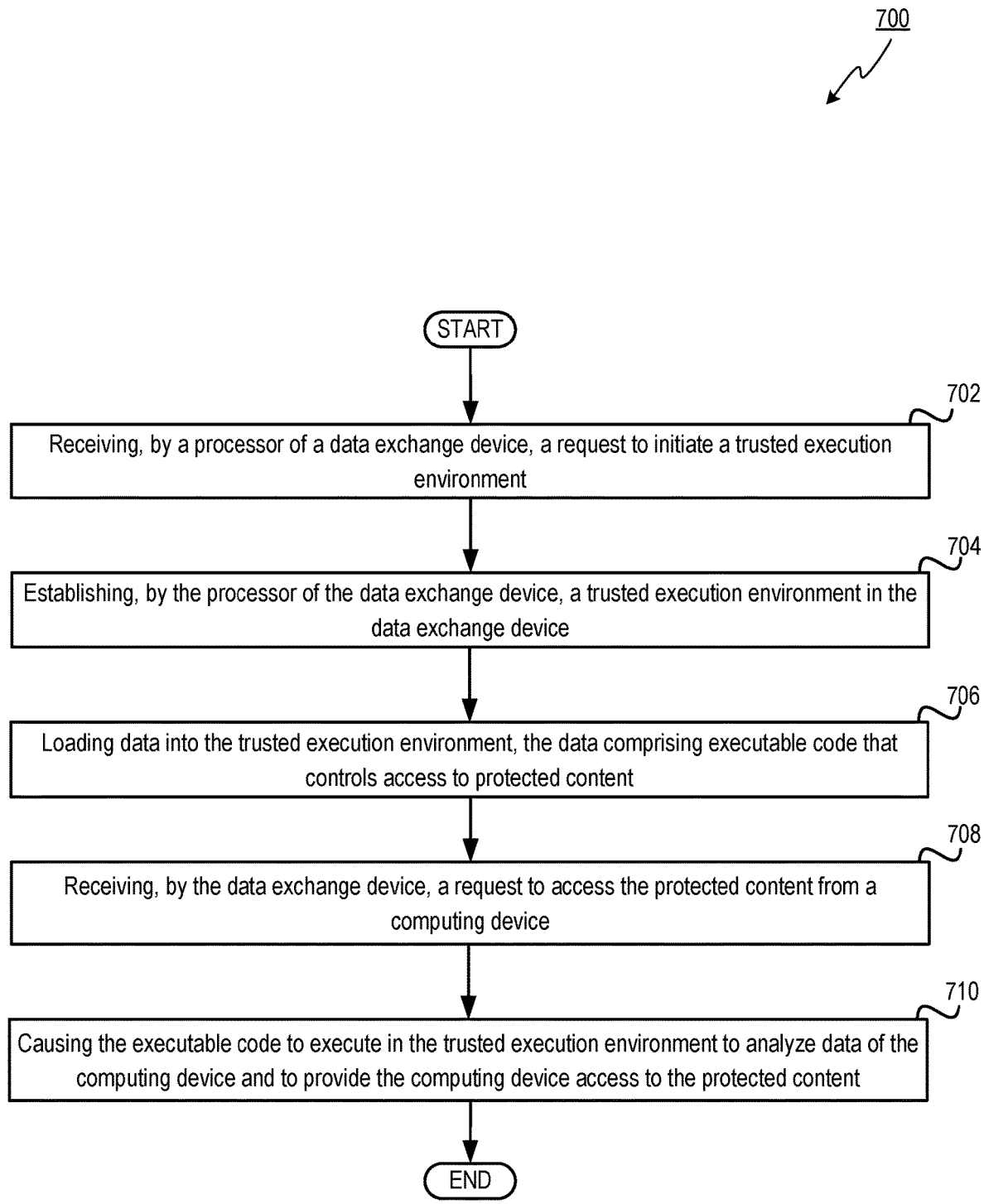
FIG. 7 depicts a flow diagram of a method performed by a data exchange device to protect and distribute executable image data to one or more computing devices, in accordance with one or more aspects of the present disclosure.

FIGS. 6 and 7 depict flow diagrams for illustrative examples of methods 600 and 700 for using a trusted execution environment to store and distribute executable image data. Methods 600 and 700 may be performed by computing devices that comprise hardware (e.g., circuitry, dedicated logic, programmable logic, microcode, etc.), executable code (such as is run on a general purpose computer system or a dedicated machine), or a combination of both. Methods 600 and 700 and each of their individual functions, routines, subroutines, or operations may be performed by one or more processors of the computing device executing the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, methods 600 and 700 may be performed by computing device 110B as shown in FIG. 1-5.

Referring to FIG. 6, method 600 may be performed by a computing device that is configured to function as a data exchange device that receives protected content from a computing device and distributes it to one or more other computing devices (e.g., recipient device). Method 600 may begin at block 602 where the processor may establish a trusted execution environment in a first computing device (e.g., the data exchange device). The trusted execution environment may include an encrypted memory area and may use memory encryption to isolate the executable code in the trusted execution environment from being accessed by processes executing external to the trusted execution environment. The processor may use hardware level encryption to store data in the encrypted memory area. The hardware level encryption may use cryptographic keys that are accessible to the processor and are inaccessible to all computing processes executed by the processor.

The first computing device may execute the executable code in the trusted execution environment as one or more application processes and the executable code in the trusted execution environment may be accessible to the one or more application processes and be inaccessible to a kernel managing the one or more application processes. In one example, the processor of the first computing device may initiate the establishment of the trusted execution environment. In another example, the processor of the first computing device may receive a request from a third computing device to establish the trusted execution environment in the first computing device. In either example, the processor may perform remote attestation of hardware and code of the first computing device and configure the encrypted memory area and an area of the processor for the trusted execution environment.

At block 604, the processor may load executable code into the trusted execution environment. The executable code may control access to protected content and the protected content may include executable image data and configuration data to enable the second device to execute the executable image data. The executable image data may include a network bootable image of an operating system and the executable code executed in the trusted execution environment may control access to the network bootable image. The network bootable image may be used by a Preboot Execution Environment (PXE) to load the operating system onto another computing device over a network. The first computing device may include a server portion of the Preboot Execution Environment and the second computing device may include a client portion of the Preboot Execution Environment (PXE).

The processor may have received the protected content from a third computing device and stored the executable image data in a persistent data storage device (e.g., retrieved or obtained via a management device). The processor may also receive a request from the second device for the executable image data. In one example, the request may be received before the protected content is received and the processor may retrieve the protected content in response to the request (e.g., initial request). In another example, the request may be received after the protected content has already been received and stored (e.g., subsequent request after content cached).

At block 606, the processor may cause the executable code to execute in the trusted execution environment to analyze data of a second computing device and to provide the second computing device access to the protected content. The data of the second computing device may include identification data of the protected content. The identification data may include an identifier of a Virtual Machine (VM) image. Providing the second computing device with access to the protected content may involve the trusted execution environment executing the executable code to transmit the executable image data to the second computing device. In one example, the executable code executed in the trusted execution environment may use a Trivial File Transfer Protocol (TFTP) to retrieve the protected content from a third device and to provide the second device with access to the executable image data in the persistent data storage device (e.g., transfer the protected content to the second device). Responsive to completing the operations described herein above with references to block 606, the method may terminate.

Referring to FIG. 7, method 700 may be performed by a processor of a data exchange device and may begin at block 702. At block 702, the processor may receive a request to initiate a trusted execution environment from a management device. The processor may perform remote attestation of hardware and code of the data exchange device before, during, or after receiving the request to initiate the trusted execution environment.

At block 704, the processor may establish the trusted execution environment in the data exchange device. The trusted execution environment may include an encrypted memory area and may use memory encryption to isolate the executable code in the trusted execution environment from being accessed by processes executing external to the trusted execution environment. The processor may use hardware level encryption to store data in the encrypted memory area. The hardware level encryption may use cryptographic keys that are accessible to the processor and are inaccessible to all computing processes executed by the processor. The data exchange device may execute the executable code in the trusted execution environment as one or more application processes and the executable code in the trusted execution environment may be accessible to the one or more application processes and be inaccessible to a kernel managing the one or more application processes.

At block 706, the processor may load data into the trusted execution environment and the data may include executable code that controls access to the protected content. The executable code may control access to protected content and the protected content may include executable image data and configuration data to enable the second device to execute the executable image data. The executable image data may include a network bootable image of an operating system and the executable code executed in the trusted execution environment may control access to the network bootable image. The network bootable image may be used by a Preboot Execution Environment (PXE) to load the operating system onto another computing device over a network. The data exchange device may include a server portion of the Preboot Execution Environment and the second computing device may include a client portion of the Preboot Execution Environment (PXE).

At block 708, the processor may receive a request to access the protected content from a computing device. In one example, the request may be received before the protected content is received and the processor may retrieve the protected content in response to the request (e.g., initial request). In another example, the request may be received after the protected content has already been received and stored (e.g., subsequent request after content cached). In either example, the processor may also receive the protected content from a management device and stored the executable image data in a persistent data storage device (e.g., retrieved or obtained via a management device).

At block 710, the processor may cause the executable code to execute in the trusted execution environment to analyze data of the computing device and to provide the computing device access to the protected content. The data of the second computing device may include identification data of the protected content. The identification data may include an identifier of a Virtual Machine (VM) image. Providing the second computing device with access to the protected content may involve the trusted execution environment executing the executable code to transmit the executable image data to the second computing device. In one example, the executable code executed in the trusted execution environment may use a Trivial File Transfer Protocol (TFTP) to retrieve the protected content from a third device and to provide the second device with access to the executable image data in the persistent data storage device (e.g., transfer the protected content to the second device). Responsive to completing the operations described herein above with references to block 710, the method may terminate.

Figure 8:
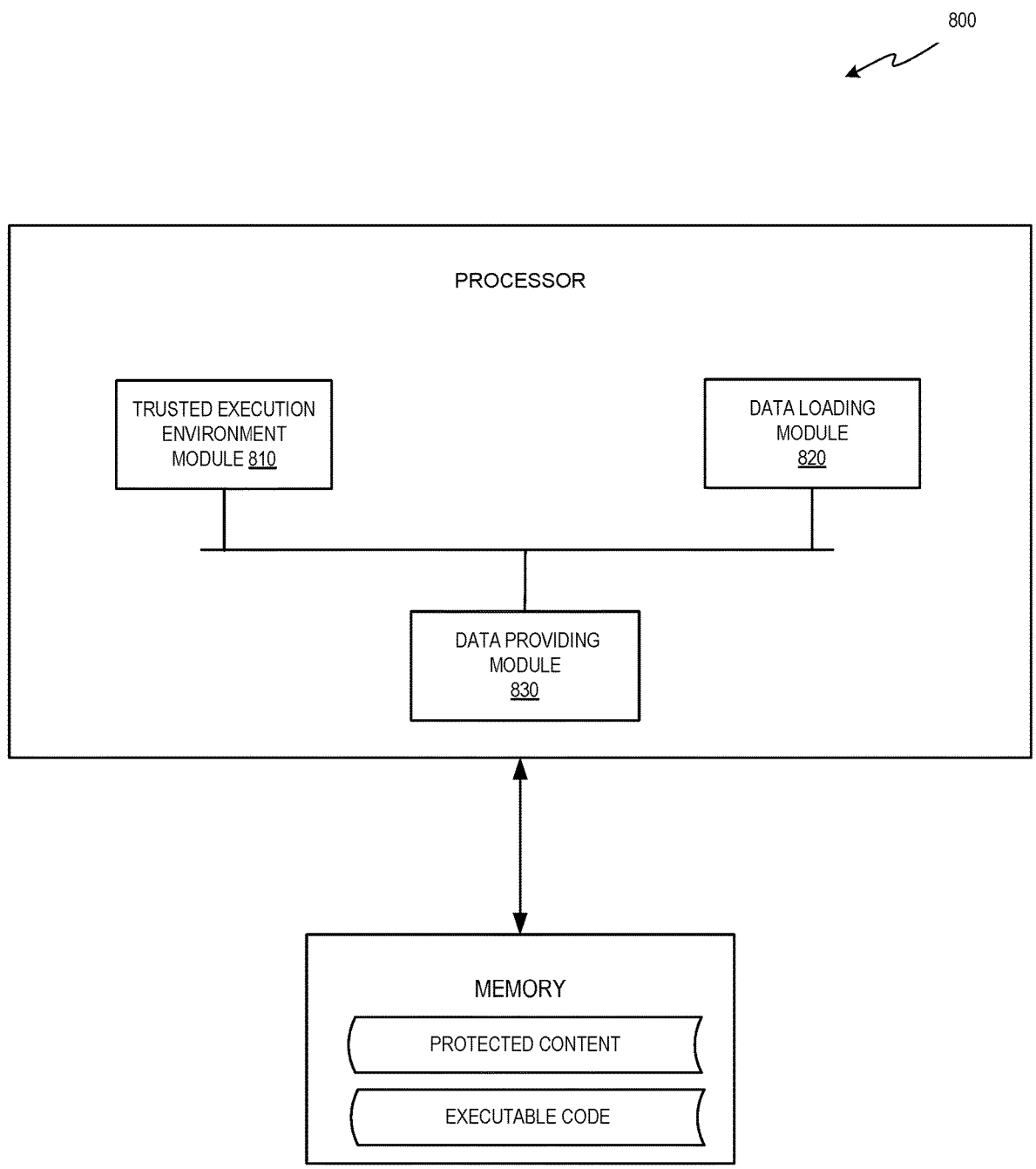
FIG. 8 depicts a block diagram of an example computing system in accordance with one or more aspects of the present disclosure.

FIG. 8 depicts a block diagram of a computer system 800 operating in accordance with one or more aspects of the present disclosure. Computer system 800 may be the same or similar to computing device 110B of FIGS. 1-5, and may include one or more processors and one or more memory devices. In the example shown, computer system 800 may include a trusted execution environment module 810, a data loading module 820, and a data providing module 830.

Trusted execution environment module 810 may enable the processor to establish a trusted execution environment in a first computing device (e.g., the data exchange device). The trusted execution environment may include an encrypted memory area and may use memory encryption to isolate the executable code in the trusted execution environment from being accessed by processes executing external to the trusted execution environment. The processor may use hardware level encryption to store data in the encrypted memory area. The hardware level encryption may use cryptographic keys that are accessible to the processor and are inaccessible to all computing processes executed by the processor.

The first computing device may execute the executable code in the trusted execution environment as one or more application processes and the executable code in the trusted execution environment may be accessible to the one or more application processes and be inaccessible to a kernel managing the one or more application processes. In one example, the processor of the first computing device may initiate the establishment of the trusted execution environment. In another example, the processor of the first computing device may receive a request from a third computing device to establish the trusted execution environment in the first computing device. In either example, the processor may perform remote attestation of hardware and code of the first computing device and configure the encrypted memory area and an area of the processor for the trusted execution environment.

Data loading module 820 may enable the processor to load executable code into the trusted execution environment. The executable code may control access to protected content and the protected content may include executable image data and configuration data to enable the second device to execute the executable image data. The executable image data may include a network bootable image of an operating system and the executable code executed in the trusted execution environment may control access to the network bootable image. The network bootable image may be used by a Preboot Execution Environment (PXE) to load the operating system onto another computing device over a network. The first computing device may include a server portion of the Preboot Execution Environment and the second computing device may include a client portion of the Preboot Execution Environment (PXE).

The processor may have received the protected content from a third computing device and stored the executable image data in a persistent data storage device (e.g., retrieved or obtained via a management device). The processor may also receive a request from the second device for the executable image data. In one example, the request may be received before the protected content is received and the processor may retrieve the protected content in response to the request (e.g., initial request). In another example, the request may be received after the protected content has already been received and stored (e.g., subsequent request after content cached).

Data providing module 830 may enable the processor to cause the executable code to execute in the trusted execution environment to analyze data of a second computing device and to provide the second computing device access to the protected content. The data of the second computing device may include identification data of the protected content. The identification data may include an identifier of a Virtual Machine (VM) image. Providing the second computing device with access to the protected content may involve the trusted execution environment executing the executable code to transmit the executable image data to the second computing device. In one example, the executable code executed in the trusted execution environment may use a Trivial File Transfer Protocol (TFTP) to retrieve the protected content from a third device and to provide the second device with access to the executable image data in the persistent data storage device (e.g., transfer the protected content to the second device).

Figure 9:
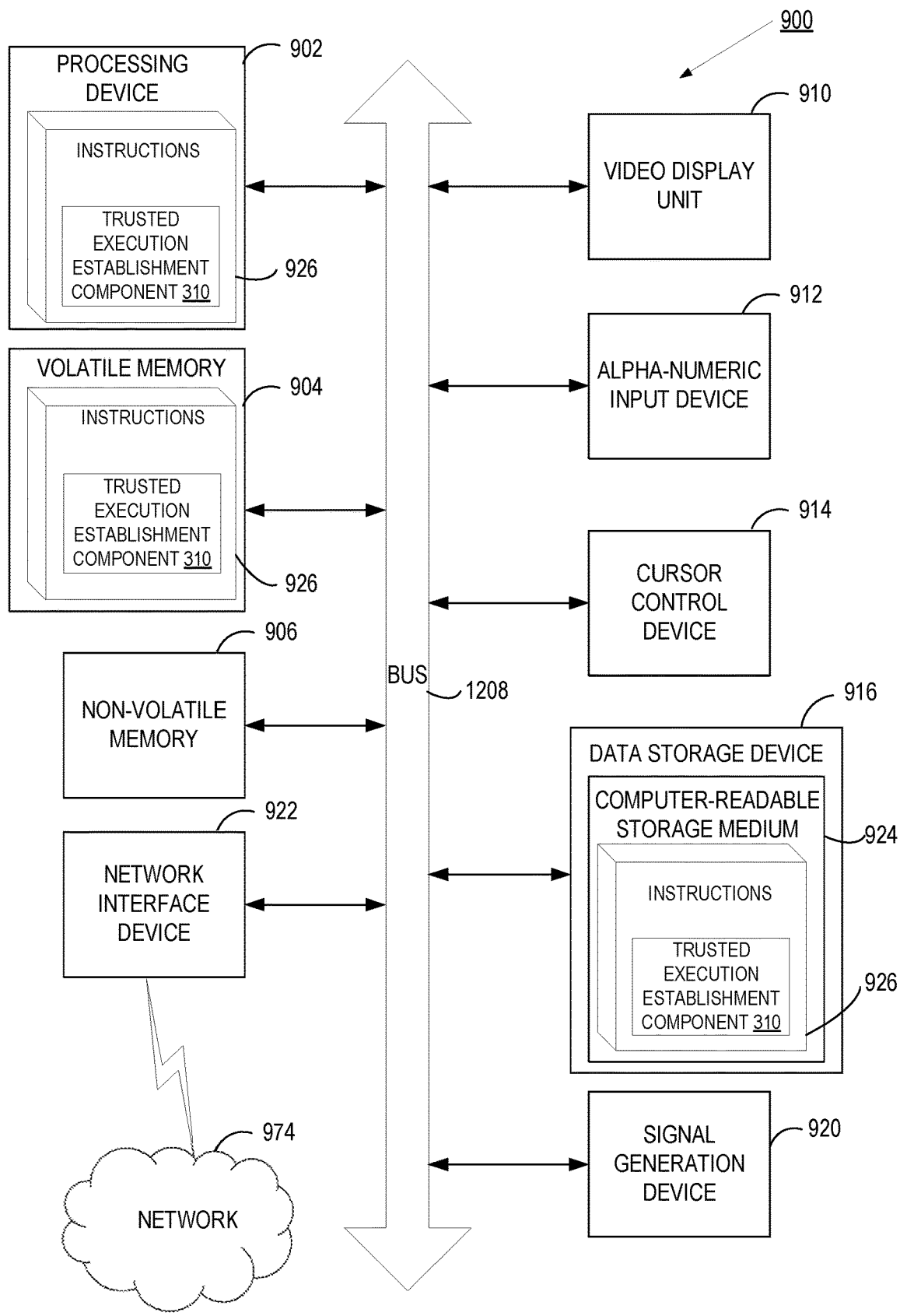
FIG. 9 depicts a block diagram of another example computing device operating in accordance with the examples of the present disclosure.

FIG. 9 depicts a block diagram of a computer system operating in accordance with one or more aspects of the present disclosure. In various illustrative examples, computer system 900 may correspond to computing device 110A-Z. Computer system 900 may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical environment, but requests for a hard disk or memory may be managed by a virtualization layer of a computing device to translate these requests to the underlying physical computing hardware resources. This type of virtualization results in multiple VMs sharing physical resources.

In certain implementations, computer system 900 may be connected (e.g., via a network, such as a Local Area Network (LAN), an intranet, an extranet, or the Internet) to other computer systems. Computer system 900 may operate in the capacity of a server or a client computer in a client-server environment, or as a peer computer in a peer-to-peer or distributed network environment. Computer system 900 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 900 may include a processing device 902, a volatile memory 904 (e.g., random access memory (RAM)), a non-volatile memory 906 (e.g., read-only memory (ROM) or electrically-erasable programmable ROM (EEPROM)), and a data storage device 916, which may communicate with each other via a bus 908.

Processing device 902 may be provided by one or more processors such as a general purpose processor (such as, for example, a complex instruction set computing (CISC) microprocessor, a reduced instruction set computing (RISC)

microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 900 may further include a network interface device 922. Computer system 900 also may include a video display unit 910 (e.g., an LCD), an alphanumeric input device 912 (e.g., a keyboard), a cursor control device 914 (e.g., a mouse), and a signal generation device 920.

Data storage device 916 may include a non-transitory computer-readable storage medium 924 on which may store instructions 926 encoding any one or more of the methods or functions described herein, including instructions for implementing methods 600 and 700, and for encoding components 310.

Instructions 926 may also reside, completely or partially, within volatile memory 904 and/or within processing device 902 during execution thereof by computer system 900, hence, volatile memory 904 and processing device 902 may also constitute machine-readable storage media.

While computer-readable storage medium 924 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein. The following examples illustrate various implementations in accordance with one or more aspects of the present disclosure.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "determining," "deriving," "encrypting," "creating," "generating," "using," "accessing," "executing," "obtaining," "storing," "transmitting," "providing," "establishing," "loading," "causing," "performing," "executing," "configuring," "receiving," "identifying," "initiating," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements (e.g., cardinal meaning) and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 600 or 700 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   receiving, by a processor of a first computing device, a request from a third computing device to establish a trusted execution environment in the first computing device,
   establishing, by the processor, the trusted execution environment in the first computing device, wherein the trusted execution environment comprises an encrypted memory area;
   loading executable code into the trusted execution environment, wherein the executable code controls access to protected content stored in a data store of the third computing device and wherein the protected content comprises executable image data; and
   causing the executable code to execute in the trusted execution environment to analyze data of a second computing device and to provide the second computing device access to the protected content stored in the data store of the third computing device.

2. The method of claim 1, wherein the executable image data comprises a network bootable image of an operating system and wherein the executable code executed in the trusted execution environment controls access to the network bootable image.

3. The method of claim 1, wherein the first computing device comprises a server portion of a Preboot Execution Environment (PXE) and the second computing device comprises a client portion of the Preboot Execution Environment (PXE).

4. The method of claim 1, further comprising:
   performing, by the processor, a remote attestation of hardware and code of the first computing device to the third computing device; and
   configuring, by the processor, the encrypted memory area and an area of the processor for the trusted execution environment.

5. The method of claim 1, wherein the executable code executed in the trusted execution environment of the first computing device uses a Trivial File Transfer Protocol (TFTP) to retrieve the protected content from the third computing device and to transfer the protected content to the second computing device.

6. The method of claim 1, further comprising:
retrieving, by the first computing device, the protected content from the third computing device, wherein the protected content comprises the executable image data and comprises configuration data to enable the second computing device to execute the executable image data;
storing the executable image data in a persistent data storage device;
receiving, by the first computing device, a request from the second computing device for the executable image data; and
providing the second computing device with access to the executable image data in the persistent data storage device.

7. The method of claim 1, wherein the data of the second computing devices comprises identification data of the protected content, wherein the identification data comprises an identifier of a Virtual Machine (VM) image.

8. The method of claim 1, wherein the trusted execution environment uses memory encryption to isolate the executable code in the trusted execution environment from being accessed by processes executing external to the trusted execution environment.

9. The method of claim 1, wherein the trusted execution environment comprises the processor using hardware level encryption to store data in the encrypted memory area, wherein the hardware level encryption uses cryptographic keys that are accessible to the processor and are inaccessible to all computing processes executed by the processor.

10. The method of claim 1, wherein the first computing device executes the executable code in the trusted execution environment as one or more use space processes, and wherein the executable code in the trusted execution environment is accessible to the one or more user space processes and is inaccessible to a kernel managing the one or more use space processes.

11. The method of claim 1, wherein providing the second computing device with access to the protected content comprises the trusted execution environment executing the executable code to transmit the executable image data to the second computing device.

12. A system comprising:
a memory; and
a processing device communicably coupled to the memory, the processing device of a first computing device to:
receive a request from a third computing device to establish a trusted execution environment in the first computing device;
establish the trusted execution environment in the first computing device, wherein the trusted execution environment comprises an encrypted memory area;
load executable code into the trusted execution environment, wherein the executable code controls access to protected content stored in a data store of the third computing device and wherein the protected content comprises executable image data; and
cause the executable code to execute in the trusted execution environment to analyze data of a second computing device and to provide the second computing device access to the protected content stored in the data store of the third computing device.

13. The system of claim 12, wherein the executable image data comprises a network bootable image of an operating system and wherein the executable code executed in the trusted execution environment controls access to the network bootable image.

14. The system of claim 12, wherein the first computing device comprises a server portion of a Preboot Execution Environment (PXE) and the second computing device comprises a client portion of the Preboot Execution Environment (PXE).

15. The system of claim 12, wherein the executable code executed in the trusted execution environment of the first computing device uses a Trivial File Transfer Protocol (TFTP) to transfer the protected content to the second computing device.

16. The system of claim 12, wherein the trusted execution environment uses memory encryption to isolate the executable code in the trusted execution environment from being accessed by processes executing external to the trusted execution environment.

17. A non-transitory machine-readable storage medium storing instructions which, when executed, cause a processing device of a data exchange device to perform operations comprising:
receiving, from a management device, a request to initiate a trusted execution environment in the data exchange device;
establishing the trusted execution environment in the data exchange device, wherein the trusted execution environment comprises an encrypted memory area;
loading data into the trusted execution environment, the data comprising executable code that controls access to protected content stored in a data store of the management device;
receiving, from a computing device, a request to access the protected content stored in the data store of the management device; and
causing the executable code to execute in the trusted execution environment to analyze data of the computing device and to provide the computing device access to the protected content stored in the data store of the management device.

18. The non-transitory machine-readable storage medium of claim 17, wherein the protected content comprises a network bootable image of an operating system and wherein the executable code executed in the trusted execution environment controls access to the network bootable image.

19. The non-transitory machine-readable storage medium of claim 17, wherein the data exchange device comprises a server portion of a Preboot Execution Environment (PXE) and the computing device comprises a client portion of the Preboot Execution Environment (PXE).

20. The non-transitory machine-readable storage medium of claim 17, wherein the executable code executed in the trusted execution environment of the data exchange device uses a Trivial File Transfer Protocol (TFTP) to transfer the protected content to the computing device.

* * * * *